(12) United States Patent
Chino

(10) Patent No.: US 10,414,606 B2
(45) Date of Patent: Sep. 17, 2019

(54) DRIVE TRANSMISSION APPARATUS, SHEET FEEDING APPARATUS AND IMAGE FORMING APPARATUS

(71) Applicant: CANON KABUSHIKI KAISHA, Tokyo (JP)

(72) Inventor: Hideto Chino, Ashigarakami-gun (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/835,962

(22) Filed: Dec. 8, 2017

(65) Prior Publication Data
US 2018/0179003 A1    Jun. 28, 2018

(30) Foreign Application Priority Data
Dec. 22, 2016    (JP) .................................. 2016-250072

(51) Int. Cl.
| | |
|---|---|
| *B65H 3/06* | (2006.01) |
| *F16H 27/08* | (2006.01) |
| *B65H 1/12* | (2006.01) |
| *B65H 5/06* | (2006.01) |
| *F16H 35/02* | (2006.01) |

(52) U.S. Cl.
CPC ............. *B65H 3/0669* (2013.01); *B65H 1/12* (2013.01); *B65H 3/0607* (2013.01); *B65H 5/06* (2013.01); *F16H 27/08* (2013.01); *F16H 35/02* (2013.01); *B65H 2403/40* (2013.01); *B65H 2403/82* (2013.01)

(58) Field of Classification Search
CPC ...... B65H 3/0669; B65H 3/0684; B65H 1/12; B65H 2403/421; B65H 2403/82; B65H 2403/80; B65H 3/0607; F16H 27/08
See application file for complete search history.

(56) References Cited

U.S. PATENT DOCUMENTS

| | | | |
|---|---|---|---|
| 4,152,982 A * | 5/1979 | Mikoshiba | ................. B41J 7/48 101/93.22 |
| 5,253,854 A | 10/1993 | Tanoue et al. | |
| 9,206,002 B2 | 12/2015 | Fukita et al. | |
| 9,298,135 B2 * | 3/2016 | Fujiwara | ............ G03G 15/0887 |
| 9,738,468 B2 | 8/2017 | Esaka | |

(Continued)

FOREIGN PATENT DOCUMENTS

| | | | | |
|---|---|---|---|---|
| DE | 2936004 A1 * | 4/1981 | | ............. F16H 27/08 |
| JP | 54022230 A | 2/1979 | | |
| JP | 04350033 A | 12/1992 | | |

(Continued)

*Primary Examiner* — Luis A Gonzalez
(74) *Attorney, Agent, or Firm* — Venable LLP

(57) ABSTRACT

A drive transmission apparatus includes a first rotating unit rotated by driving force from a drive source and a second rotating unit rotated by the first rotating unit. The first and second rotating units include a first gear pair meshing at a first transmission ratio and second gear pair meshing at a second transmission ratio. A retention mechanism includes a protruded portion provided on the first rotating unit and a recessed portion provided on the second rotating unit, and is configured to retain a rotation angle of the second rotating unit by an engagement of the protruded portion and the recessed portion in a state where the first and second gear pairs are unmeshed.

12 Claims, 27 Drawing Sheets

(56) References Cited

U.S. PATENT DOCUMENTS 9,891,580 B2 * 2/2018 Chino ............... G03G 21/1647

FOREIGN PATENT DOCUMENTS

| JP | 05196113 A | * | 8/1993 |
| JP | 2008013297 A | | 1/2008 |
| JP | 2013216398 A | | 10/2013 |
| JP | 2016150846 A | | 8/2016 |

* cited by examiner

DRIVE TRANSMISSION APPARATUS, SHEET FEEDING APPARATUS AND IMAGE FORMING APPARATUS

BACKGROUND OF THE INVENTION

Field of the Invention

The present invention relates to an image forming apparatus configured to form an image on a sheet, a sheet feeding apparatus used in the image forming apparatus and the like, and a drive transmission apparatus used in the sheet feeding apparatus and the like.

Description of the Related Art

There are cases where image forming apparatuses, typical examples of which include printers and copying machines, are required to drive an object at a plurality of drive speeds using driving force provided from a drive source. For example, in a configuration where a plurality of members are driven by a common drive source, there are cases where the preferable driving speeds differ according to each member to be driven.

Japanese Unexamined Patent Application Publication No. 2013-216398 discloses a sheet feeding apparatus having a single motor configured to control the rotation of a sheet feed roller and the lifting and lowering of a bottom plate, wherein a rotational speed of the motor when lifting the bottom plate is set slower than that when feeding a sheet by the sheet feed roller. According to this apparatus, the rotation speed of the motor is reduced while lifting the bottom plate, such that noise and the like caused by the bottom plate colliding against the sheet feed roller can be reduced, and the rotation speed of the motor is increased during feeding of sheets, such that productivity is ensured.

However, according to the configuration taught in the above-described document, there were cases where time accuracy of operations performed by the sheet feeding apparatus was deteriorated due to irregularity in timing at which the rotational speed of the motor was actually changed. As a result, there was a deviation in the time required from start to end of operation of feeding one sheet of paper, and this deviation may hinder improvement of productivity of the image forming apparatus.

SUMMARY OF THE INVENTION

The present invention provides a drive transmission apparatus that can transmit driving force from a drive source to an object to be driven while shifting driving speed and that can be operated in a stable manner, and a sheet feeding apparatus and an image forming apparatus equipped with the drive transmission apparatus.

According to one aspect of the present invention, a drive transmission apparatus includes: a first rotating unit having a first driving gear and a second driving gear and configured to be rotated by driving force from a drive source; a second rotating unit having a first driven gear configured to mesh with the first driving gear by a first transmission ratio and a second driven gear configured to mesh with the second driving gear by a second transmission ratio that differs from the first transmission ratio, wherein the second rotating unit is configured to switch, along with rotation of the first rotating unit, between a state in which the second rotating unit is rotated by meshing of the first driving gear and the first driven gear and a state in which the second rotating unit is rotated by meshing of the second driving gear and the second driven gear; and a retention mechanism having a protruded portion provided on the first rotating unit and protruded radially outward with respect to a rotational axis of the first rotating unit and a recessed portion provided on the second rotating unit and formed into a recessed shape engageable with the protruded portion, the retention mechanism being configured to retain a rotation angle of the second rotating unit by an engagement of the protruded portion and the recessed portion while permitting rotation of the first rotating unit in a state where the first and second driving gears are unmeshed from the first and second driven gears.

According to another aspect of the present invention, a sheet feeding apparatus includes: a sheet supporting portion configured to support a sheet; a sheet feeding member configured to contact the sheet on the sheet supporting portion and feed the sheet; a cam member configured to move the sheet supporting portion to a position where the sheet feeding member is able to contact the sheet on the sheet supporting portion and a position where the sheet feeding member is separated from the sheet on the sheet supporting portion; an urging member configured to urge the sheet supporting portion in a direction approaching the sheet feeding member; a drive source configured to supply driving force; and a drive transmission apparatus. The drive transmission apparatus includes: a first stepped gear having a first driving gear and a second driving gear, the first and second driving gears being configured to be integrally rotated by the driving force from the drive source; a second stepped gear having a first driven gear configured to be meshed with the first driving gear and a second driven gear configured to be meshed with the second driving gear at a first transmission ratio, the first and second driven gears being configured to be integrally rotated during the first stepped gear rotates once such that (i) the second stepped gear is rotated at a first speed by meshing of the first driving gear and the first driven gear, and drives the cam member so that the sheet feeding member comes into contact with the sheet on the sheet supporting portion, and (ii) the second stepped gear is rotated at a second speed that is greater than the first speed by meshing of the second driving gear and the second driven gear, and drives the sheet feeding member to feed the sheet; and a retention mechanism including: a convex portion provided on the first stepped gear and formed into a circular arc shape centering on a rotational axis of the first stepped gear; and a concave portion provided on the second stepped gear and formed into a concaved shape engageable with the convex portion, the retention mechanism being configured to retain a rotation angle of the second stepped gear by an engagement of the convex portion and the concave portion while permitting rotation of the first stepped gear during a period after the first driving gear and the first driven gear are unmeshed and before the second driving gear and the second driven gear are meshed.

Further features of the present invention will become apparent from the following description of exemplary embodiments with reference to the attached drawings.

DESCRIPTION OF THE EMBODIMENTS

Now, we will describe exemplary embodiments with reference to the drawings.

First Embodiment

Figure 1:
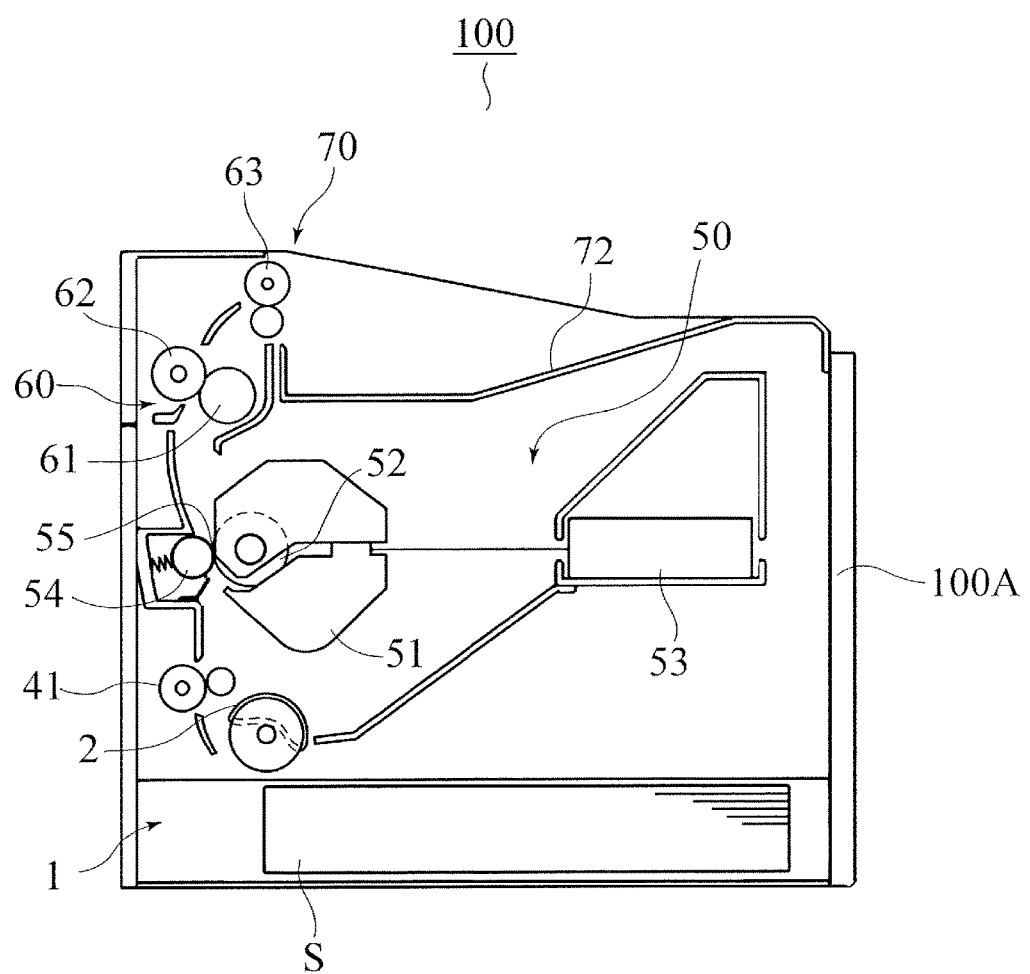
FIG. 1 is a schematic view illustrating a configuration of an image forming apparatus.

First, a configuration of a printer 100 as an example of an image forming apparatus will be described with reference to FIG. 1. As illustrated in FIG. 1, the printer 100 is composed of a sheet feeding portion 1, an image forming portion 50, and a sheet discharge portion 70, and forms an image on a sheet S based on image information such as data received from an external PC. The sheet S serving as a recording media can be paper such as sheets and envelopes, a plastic film such as overhead-projector (OHP) sheets, a cloth, and so on.

The image forming portion 50 adopts a configuration of an electrophotographic system. That is, the image forming portion 50 has an image forming unit 51 including a photosensitive drum 52 which is a drum-shaped photoconductor, an exposing unit 53 to expose the photosensitive drum 52, a transfer roller 54, and a fixing unit 60. When the printer 100 receives a request to start image forming operation, laser beams corresponding to the image information are projected from the exposing unit 53 to the surface of the photosensitive drum 52 charged uniformly in advance, and thus an electrostatic latent image is formed on the surface of the drum. The electrostatic latent image is developed as a toner image in the image forming unit 51. The toner image borne on the photosensitive drum 52 is transferred by transfer bias voltage applied on the transfer roller 54 to the sheet S at a transfer portion 55 between the photosensitive drum 52 and the transfer roller 54. The sheet S onto which an unfixed toner image has been transferred is delivered to the fixing unit 60. The fixing unit 60 is provided with a roller pair composed of a fixing roller 62 and a counter roller 61, and configured to nip and convey the sheet S while applying heat and pressure to toner particles, by which the toner image is fixed to the sheet S. It is noted that the above-described image forming portion 50 is merely an example of an image forming portion, and the image forming portion can be an electro-photographic system having an intermediate transfer member such as an intermediate transfer belt, or can be replaced with other known image forming mechanisms such as an ink-jet printing system.

As described in detail later, the sheet feeding portion 1 includes a sheet supporting portion configured to support the sheet S, and a sheet feed roller 2 configured to feed the sheet S, by which the sheet S is fed one by one. The sheet S sent out from the sheet feeding portion 1 is conveyed by a conveyance roller pair 41 toward the transfer portion 55 at a matched timing with the advancement of toner image forming operation by the image forming unit 51. The sheet S to which a toner image has been transferred at the transfer portion 55 and the image has been fixed by the fixing unit 60 is delivered to a sheet discharge roller pair 63 of the sheet discharge portion 70, and discharged onto a sheet discharge tray 72 provided on an upper portion of a printer body 100A.

Sheet Feeding Portion

Figure 2A:
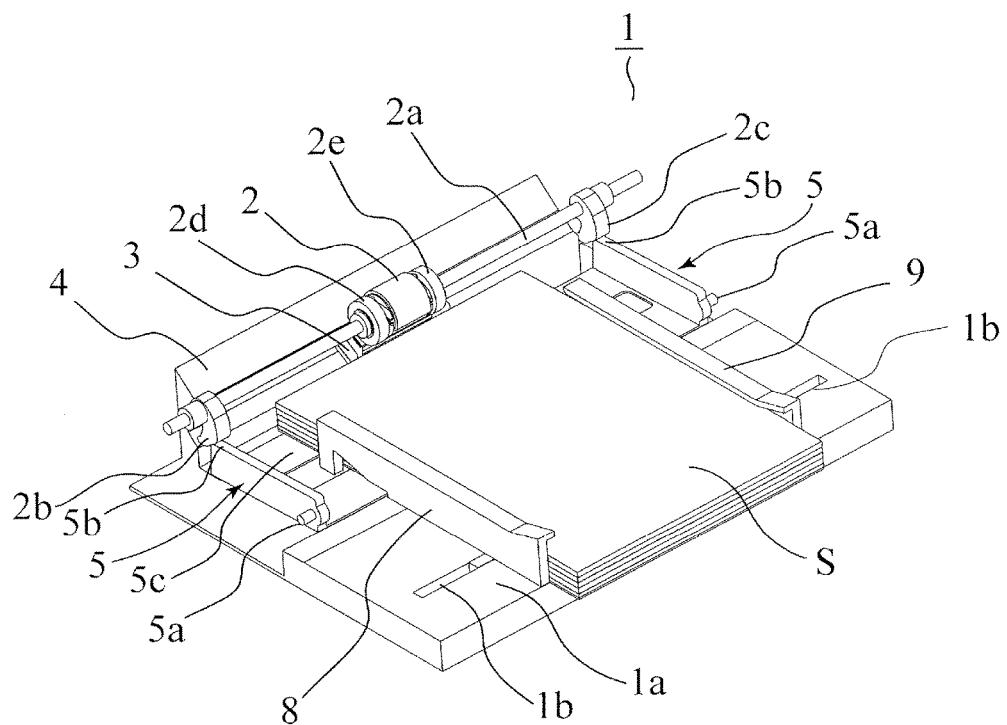
FIG. 2A is a perspective view illustrating a sheet feeding portion of the image forming apparatus.
Figure 2B:
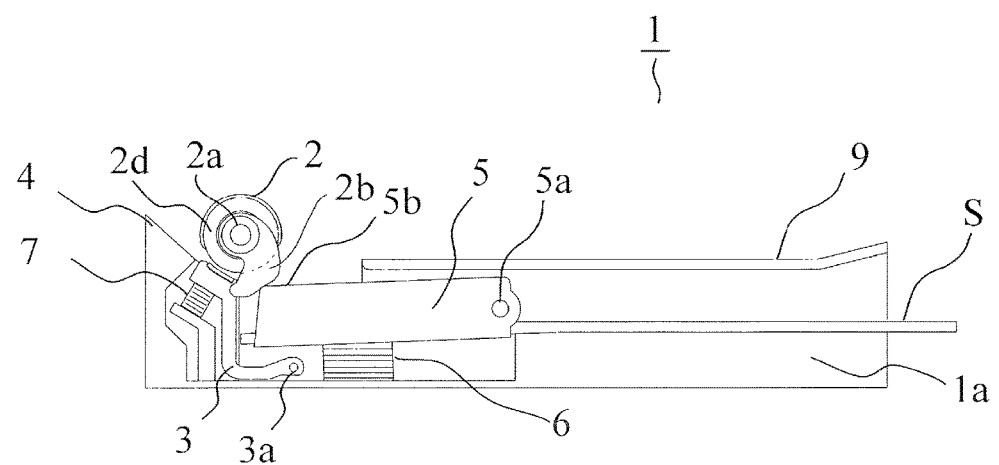
FIG. 2B is a side view of the sheet feeding portion.

As illustrated in FIGS. 2A and 2B, the sheet feeding portion 1 as an example of the sheet feeding apparatus includes a tray 1a and an elevating plate 5 serving as a sheet supporting portion, a feed roller 2 serving as a sheet feeding member, a separating pad 3, and a conveyance guide 4. A stack of sheets S can be supported on an upper surface of the tray 1a. Further, side regulation members 8 and 9 capable of regulating the position of the supported sheets S are arranged on the tray 1a. The side regulation members 8 and 9 can move along a guide groove 1b formed in a width direction of the sheet S, that is, a direction orthogonal to a conveyance direction of the sheet S by the feed roller 2 (hereinafter referred to as a sheet feeding direction), and regulate the sheet position by abutting against both end portions of the sheet S in the width direction.

The elevating plate 5 is a swinging member that includes a supporting portion 5c that supports a downstream portion in a sheet feeding direction of the sheet S supported on the tray 1a, and that is swingable in a vertical direction centered around a pivot shaft 5a, that is, swingable in a direction moving toward and away from the feed roller 2. A feed spring 6 is arranged below the elevating plate 5 as an urging member configured to urge the elevating plate 5 upward, that is, urge the elevating plate 5 toward a direction approaching the feed roller 2.

The feed roller 2 is detachably attached via a holder not shown to a feed shaft 2a extending along the width direction, and rotates integrally with the feed shaft 2a. Roller members 2d and 2e are attached to the feed shaft 2a on both sides in the width direction of the feed roller 2 in a state loosely fit to the feed shaft 2a. The separating pad 3 is supported swingably by a rotation support shaft 3a, and pressed by a pad spring 7 toward the feed roller 2 and the roller members 2d and 2e.

The feed roller 2 is a roller having a noncircular cross-section, and a circular arc shaped outer circumference portion provided over a predetermined angle with respect to the feed shaft 2a (i.e., a portion that contacts and applies conveyance force to the sheet S) is composed of a rubber member. Further, a radius of curvature of the outer circumference portion of the feed roller 2 is set somewhat greater than that of the roller members 2d and 2e, and the outer circumference portion is designed to protrude outward from a circumference surface of the roller members 2d and 2e. Therefore, in a state where the feed roller 2 is not in pressure contact with the separating pad 3, the roller members 2d and 2e are in pressure contact with the separating pad 3.

Elevating cams 2b and 2c, which are cam members, having the same shape and arranged in the same posture with one another, are mounted on both side portions of the feed shaft 2a. The cams 2b and 2c serve as an elevating mechanism configured to elevate and lower the elevating plate. The elevating cams 2b and 2c abut against cam contact portions 5b and 5c provided on both end portions of the elevating plate 5 in the width direction, and swing the elevating plate 5 along with the rotation of the feed shaft 2a. Thereby, the elevating plate 5 moves to a sheet feed position where an upper surface of the sheet S supported on the supporting portion 5c abuts against the outer circumference portion of the feed roller 2 and the roller members 2d and 2e, and to a standby position in which the upper surface of the sheet S is separated from the feed roller 2. That is, the elevating cams 2b and 2c are an example of a switching mechanism capable of switching between a first state in which the feed roller 2 is able to contact the sheet and a second state in which the feed roller 2 is separated from the sheet S, by relatively moving the elevating plate 5 serving as the sheet supporting portion and the feed roller 2 serving as the sheet feeding member. In place of the configuration in which a portion of the sheet supporting portion is swung, it is possible to utilize a switching mechanism capable of switching between the first state and the second state by swinging a retaining member configured to retain the sheet feeding member, such as the pickup roller.

Next, a sheet feeding operation performed by the sheet feeding portion 1 will be described with reference to FIGS. 2 and 3. In a standby state prior to starting the sheet feeding operation, as illustrated in FIG. 2B, the elevating plate 5 is pushed down by the cam 2b, and the feed roller 2 is separated from the sheet S. When the sheet feeding operation is started, the feed shaft 2a starts to rotate by the driving force provided from a drive transmission apparatus described later, by which the feed roller 2 and the elevating cam 2b start to rotate. Then, the cam contact portion 5b of the elevating plate 5 moves along the circumference surface of the elevating cam 2b, and swings upward by urging force of the feed spring 6.

Figure 3A:
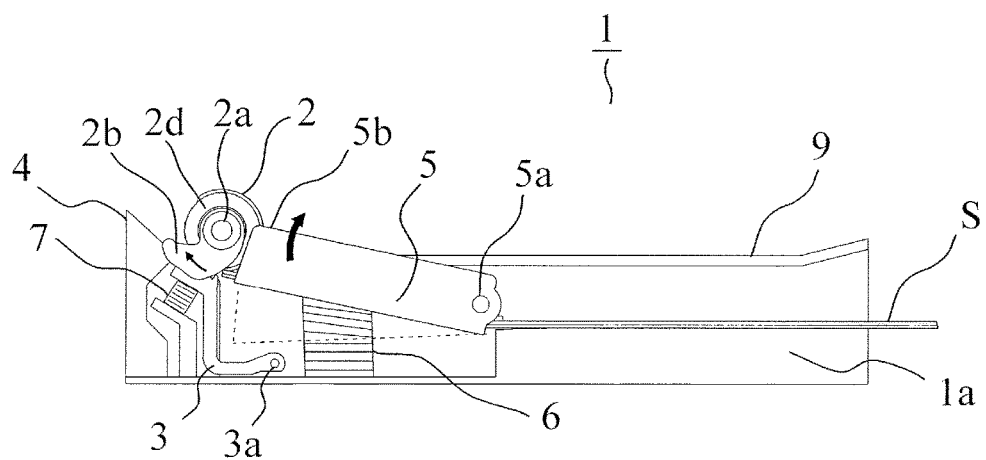
FIG. 3A is a side view of the sheet feeding portion in a state where a sheet feeding operation has been started.
Figure 3B:
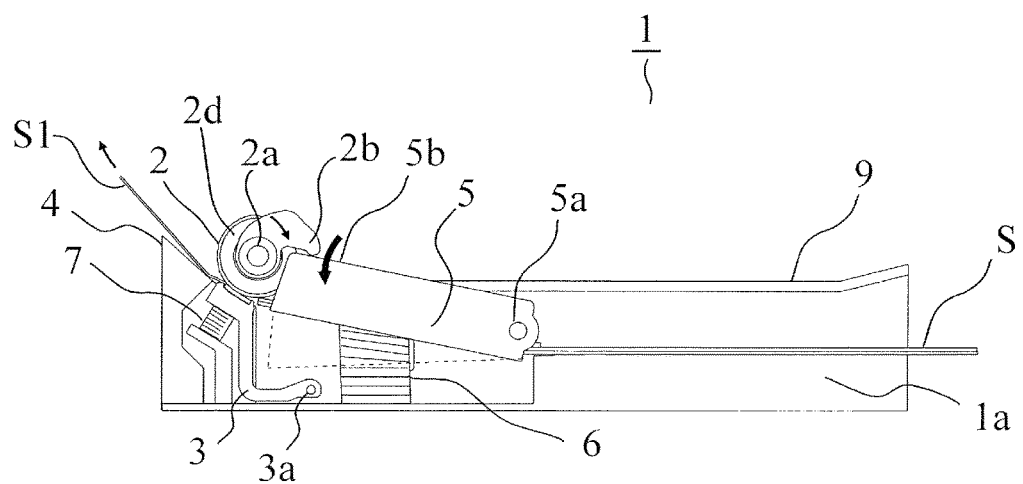
FIG. 3B is a side view of the sheet feeding portion in a process of the sheet feeding operation.

As illustrated in FIG. 3A, in a state where the feed shaft 2a rotates to an angle where the elevating cam 2b separates from the cam contact portion 5b (60 degrees from the standby state according to the illustrated example), the upper surface of the sheet S supported on the elevating plate 5 abuts against the roller member 2d. In this state, when the feed shaft 2a rotates further as illustrated in FIG. 3B, the outer circumference portion of the feed roller 2 contacts the sheet S, and an uppermost sheet S1 is sent out by frictional force applied from the feed roller 2. The sheet S conveyed by the feed roller 2 is separated from the other sheets by the separating pad 3, and conveyed toward the conveyance roller pair 41 disposed downstream thereof along the conveyance guide 4.

In a state where the feed shaft 2a rotates further and reaches a position of 258 degrees from the standby state, the elevating cam 2b abuts against the cam contact portion 5b again, and pushes down the elevating plate 5 while resisting against the urging force of the feed spring 6. Then, in a state where the feed shaft 2a is rotated once, the elevating plate 5 is pushed down to the standby position illustrated in FIG. 2 by the elevating cam 2b, and the sheet S supported on the elevating plate 5 returns to a state separated from the feed roller 2. As described, the sheet feeding portion 1 executes a sheet feeding operation in which the elevating plate 5 performs one reciprocating swinging movement in the vertical direction every time the feed shaft 2a rotates once, and the feed roller 2 sends out the uppermost sheet S1.

Drive Transmission Apparatus

Figure 4:
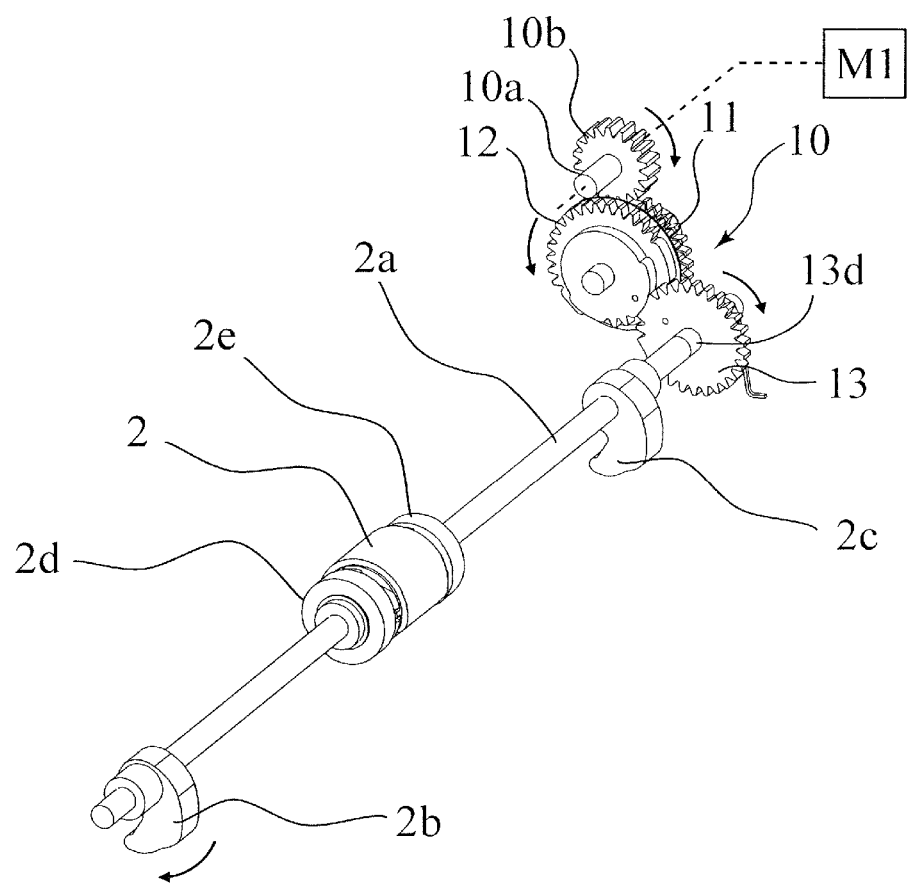
FIG. 4 is a perspective view focused on a portion of a drive transmission apparatus and a sheet feeding portion according to a first embodiment.

Next, a driving mechanism for driving the feed shaft 2a and having the sheet feeding portion 1 execute the sheet feeding operation will be described. As illustrated in FIG. 4, the feed shaft 2a is connected through a drive transmission apparatus 10 to a feeding motor M1 serving as a drive source. That is, the drive transmission apparatus includes an input shaft 10a connected directly or indirectly to the feeding motor M1 and an output shaft 13d connected to the feed shaft 2a, and can drive the sheet feeding portion 1 by transmitting the driving force of the feeding motor M1 to the feed shaft 2a.

Figure 5A:
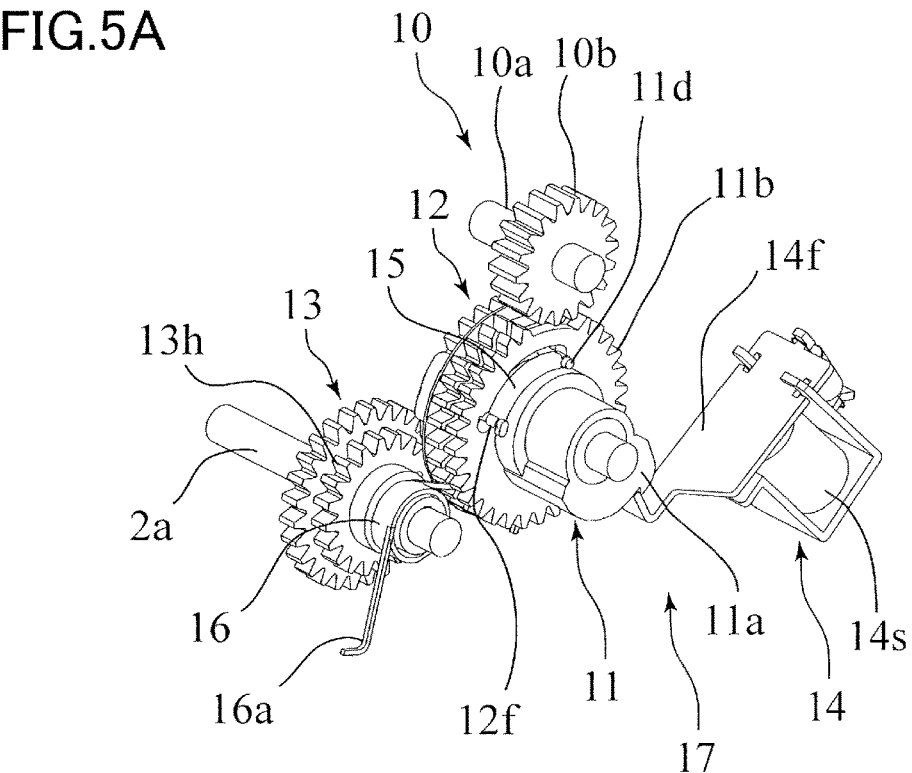
FIG. 5A is a perspective view of the drive transmission apparatus according to a first embodiment.
Figure 5B:
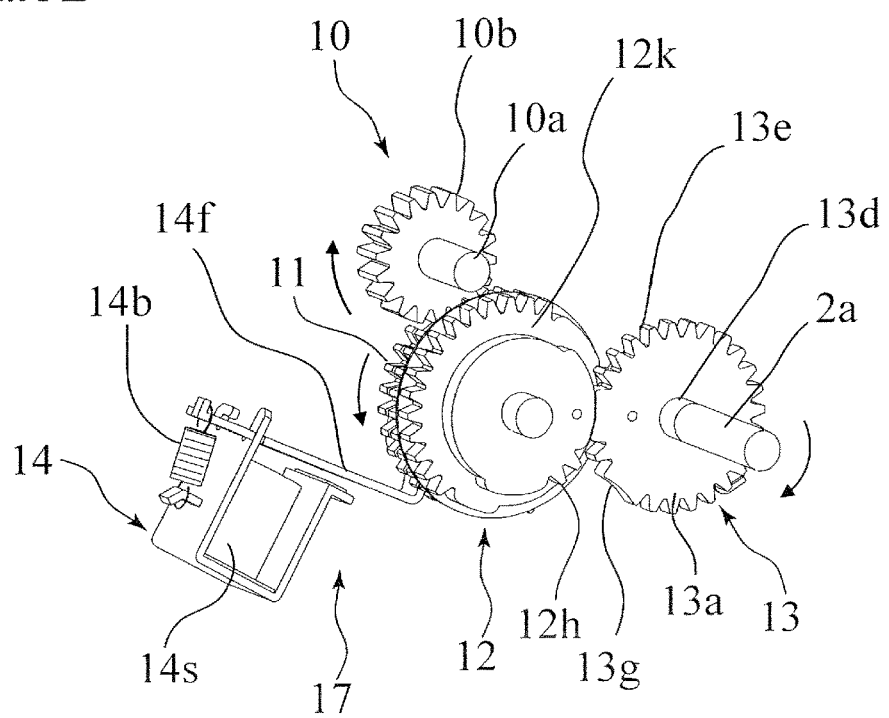
FIG. 5B is a perspective view of the drive transmission apparatus according to the first embodiment.
Figure 6:
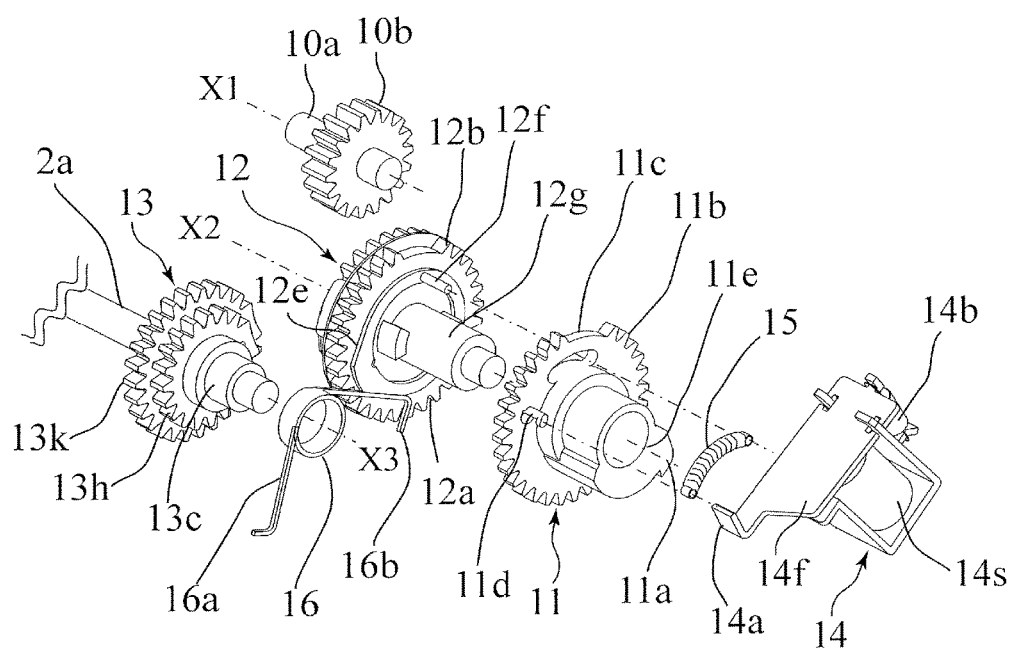
FIG. 6 is an exploded view of the drive transmission apparatus according to the first embodiment.
Figure 7A:
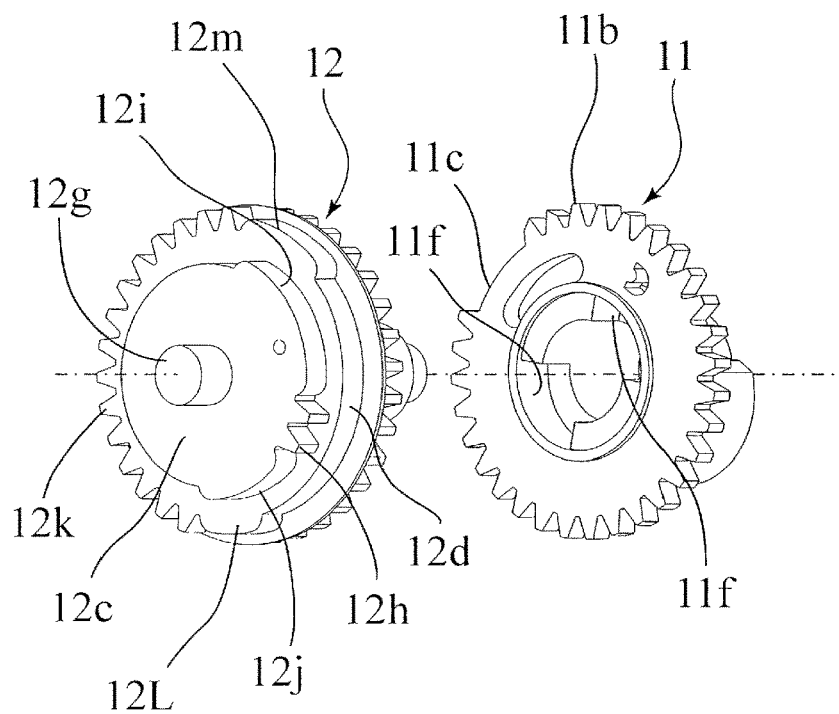
FIG. 7A is an exploded view of a trigger gear and a first stepped gear according to the first embodiment.
Figure 7B:
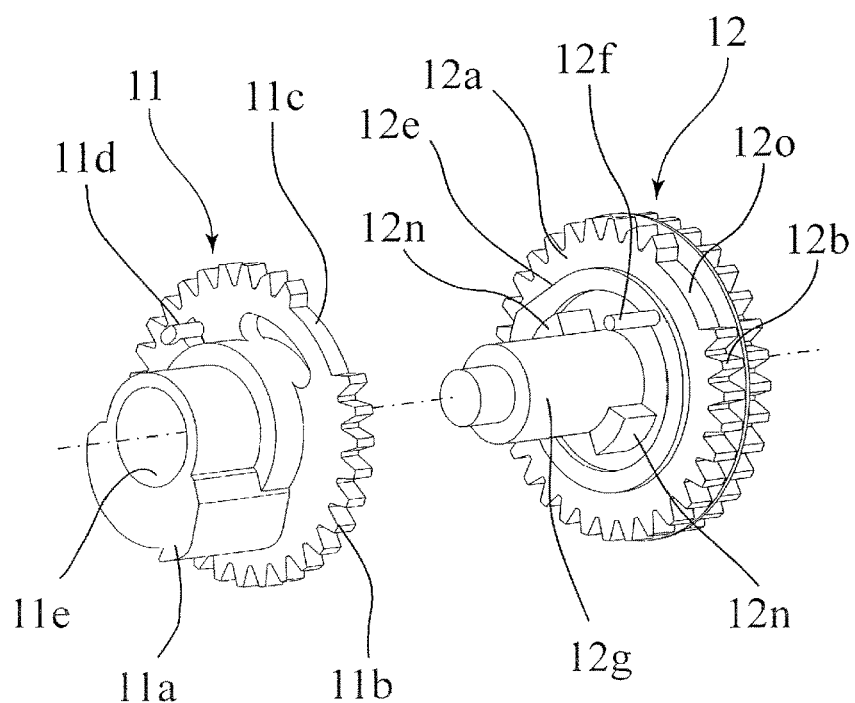
FIG. 7B is an exploded view of the trigger gear and the first stepped gear according to the first embodiment.
Figure 8A:
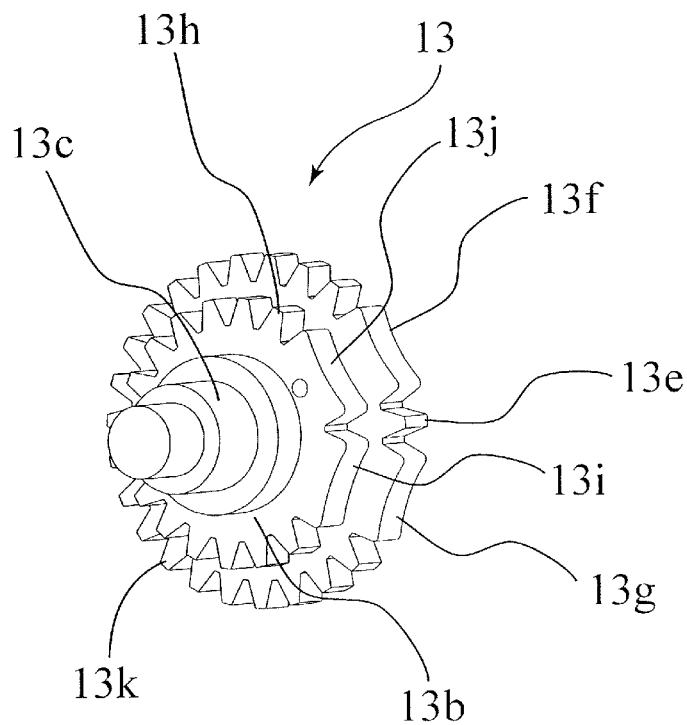
FIG. 8A is a perspective view of a second stepped gear according to the first embodiment.
Figure 8B:
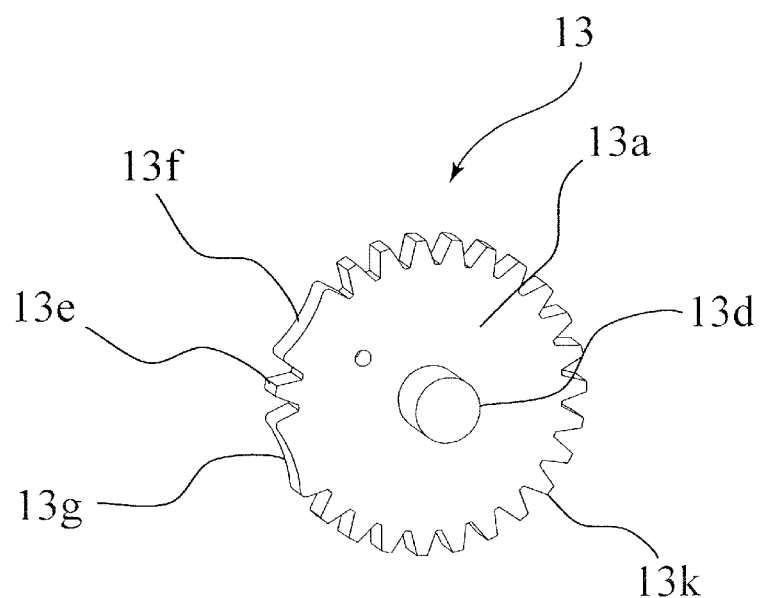
FIG. 8B is a perspective view of the second stepped gear according to the first embodiment.

Now, a configuration of the drive transmission apparatus 10 will be described with reference to FIGS. 5 through 9. FIG. 5A is a perspective view of the drive transmission apparatus 10 taken from a backside of the printer body, and FIG. 5B is a perspective view of the drive transmission apparatus 10 taken from the opposite side to FIG. 5A. FIG. 6 is an exploded view of the drive transmission apparatus 10. FIGS. 7A and 7B are exploded views illustrating a trigger gear 11 and a first stepped gear 12 of the drive transmission apparatus 10. FIGS. 8A and 8B are perspective views illustrating a second stepped gear 13 of the drive transmission apparatus 10.

As illustrated in FIGS. 5A and 5B, the drive transmission apparatus 10 includes a drive input gear 10b, a trigger gear 11, a first stepped gear 12, a second stepped gear 13, a solenoid unit 14, a trigger spring 15, and a torsion spring 16. The drive input gear 10b, the first stepped gear 12 and the second stepped gear 13 constitute a drive transmission path configured to transmit the rotation of the input shaft 10a to the output shaft 13d. On the other hand, the trigger gear 11, the solenoid unit 14, the trigger spring 15 and the torsion spring 16 constitute a rotation control mechanism 17 capable of controlling a rotation amount of the first stepped gear 12 with one rotation of the first stepped gear 12 as one cycle.

As illustrated in FIG. 6, the drive input gear 10b is attached to the input shaft 10a and integrally rotated with the input shaft 10a. The trigger gear 11 and the first stepped gear 12 are both rotatable members rotatable around a rotational axis X2 parallel to a rotational axis X1 of the drive input gear 10b. Moreover, the second stepped gear 13 is a rotating member capable of turning around a rotational axis X3 parallel to the rotational axes X1 and X2.

As illustrated in FIGS. 7A and 7B, the first stepped gear 12, which is an example of a first rotating unit, includes a shaft portion 12g, a driven gear 12a meshed with the drive input gear 10b, a small driving gear 12c serving as a first driving gear, and a large driving gear 12d serving as a second driving gear. The driven gear 12a, the small driving gear 12c and the large driving gear 12d are integrally rotated with the shaft portion 12g serving as the first shaft member.

The driven gear 12a, the small driving gear 12c and the large driving gear 12d are all so-called partially toothed gears (or chipped tooth gears) having toothed portions 12b, 12h and 12k formed to a part of the gear in the circumferential direction. A first convex portion 12i and a second convex portion 12j, having outer surfaces with the same shape as a pitch circle of the toothed portion 12h, are formed on non-toothed portions of the small driving gear 12c on both sides of the toothed portion 12h in the circumferential direction. Further, a third convex portion 12L and a fourth convex portion 12m, having outer surfaces with the same shape as a pitch circle of the toothed portion 12k, are formed on non-toothed portions of the large driving gear 12d on both sides of the toothed portion 12k in the circumferential direction. Each of the first through fourth convex portions 12i, 12j, 12L and 12m is an example of a protruded portion provided on the first rotating unit.

As illustrated in FIGS. 8A and 8B, the second stepped gear 13, which is an example of a second rotating unit, includes a large driven gear 13a configured to mesh with the small driving gear 12c, and a small driven gear 13b configured to mesh with the large driving gear 12d. The large driven gear 13a serves as a first driven gear and has a toothed portion 13e configured to mesh with the toothed portion 12h of the small driving gear 12c. The small driven gear 13b serves as a second driven gear and has a toothed portion 13h configured to mesh with the toothed portion 12k of the large driving gear 12d. The large driven gear 13a and the small driven gear 13b are integrally rotated with the output shaft 13d.

Both the large driven gear 13a and the small driven gear 13b are so-called partially toothed gears (or chipped tooth gears) having toothed portions 13e and 13h formed to a part of the gears in the circumferential direction. A first concave portion 13f and a second concave portion 13g, which are recessed shape portions with a curvature substantially equal to the pitch circle of the small driving gear 12c, are formed at non-toothed portions of the large driven gear 13a on both sides of the toothed portion 13e in the circumferential direction. Further, a third concave portion 13i and a fourth concave portion 13j, which are recessed shape portions with a curvature substantially equal to the pitch circle of the large driving gear 12d, are formed at non-toothed portions of the small driven gear 13b on both sides of the toothed portion 13h in the circumferential direction. That is, the first concave portion 13f, the second concave portion 13g, the third concave portion 13i and the fourth concave portion 13j of the second stepped gear 13 are recessed portions respectively engageable with the first convex portion 12i, the second convex portion 12j, the third convex portion 12L and the fourth convex portion 12m of the first stepped gear 12. As described later, these convex portions 12i, 12j, 12L and 12m and these concave portions 13f, 13g, 13i and 13j function as a retention mechanism capable of retaining the rotation angle (i.e., rotational phase) of the second stepped gear 13 in the course of the sheet feeding operation.

A transmission ratio (i.e., a number of rotations of a driven gear when the driving gear rotates once) of the small driving gear 12c and the large driven gear 13a is set to a value that differs from a transmission ratio of the large driving gear 12d and the small driven gear 13b. In other words, a first transmission ratio corresponding to a gear ratio of the small driving gear 12c and the large driven gear 13a is set relatively low, and a second transmission ratio corresponding to a gear ratio of the large driving gear 12d and the small driven gear 13b is set relatively high.

In the illustrated example, the toothed portion 12h of the small driving gear 12c is composed of two teeth formed at a pitch corresponding to a 25-teeth cogwheel, and the toothed portion 13e of the large driven gear 13a is composed of one tooth with two tooth grooves formed at a pitch corresponding to a 27-teeth cogwheel. Therefore, the transmission ratio from the small driving gear 12c to the large driven gear 13a is 25/27. Meanwhile, the toothed portion 12k of the large driving gear 12d is composed of 15 teeth formed at a pitch corresponding to a 32-teeth cogwheel, and the toothed portion 13h of the small driven gear 13b is composed of 14 teeth with 15 tooth grooves formed at a pitch corresponding to a 20-teeth cogwheel. Therefore, the transmission ratio from the small driving gear 12c to the large driven gear 13a is 32/20.

As illustrated in FIGS. 8A and 8B, a toothed portion 13k that is usually not involved with the drive transmission from the first stepped gear 12 is provided on the large driven gear 13a at a range in rotation angle that differs from the toothed portion 13e. In the following description, it is explained that the output of driving force from the second stepped gear 13 to the driving object is performed through the output shaft 13d, but a configuration may be adopted where the toothed portion 13k is drive-coupled to the driving object.

Single Rotation Control

Next, the configuration and operation of the rotation control mechanism 17 will be described. As illustrated in FIGS. 7A and 7B, the trigger gear 11 is a partially toothed gear formed at the same pitch as the input gear 10b of the first stepped gear 12, and includes a toothed portion 11b meshed with the drive input gear 10b and a non-toothed portion 11c not meshing with the drive input gear 10b.

The trigger gear 11 has a bearing portion 11e that fits to the shaft portion 12g of the first stepped gear 12, and is relatively rotated with respect to the first stepped gear 12. Meanwhile, key portions 12n and 12n are provided in a protruded manner on the shaft portion 12g of the first stepped gear 12, and key grooves 11f and 11f that engage with the key portions 12n and 12n are provided on the bearing portion 11e of the trigger gear 11. Thereby, the range of relative angle that the trigger gear 11 and the first stepped gear 12 may take is regulated. Further, as illustrated in FIG. 6, the trigger spring 15 is arranged between a boss portion 11d of the trigger gear 11 and a boss portion 12f of the first stepped gear 12, and urges the trigger gear 11 in a predetermined direction with respect to the first stepped gear 12.

As illustrated in FIG. 6, the trigger gear 11 has a lock portion 11a locked by the solenoid unit 14. The solenoid unit 14 includes a flap 14f having a locking claw 14a engageable with the lock portion 11a, and a solenoid 14s that drives the flap 14f to a direction moving away from the lock portion 11a. The solenoid unit 14 has a return spring 14b that urges the flap 14f toward an engagement position with respect to the lock portion 11a in a state where the solenoid 14s is in a non-energized state.

Further, the torsion spring 16 is retained by a shaft portion 13c of the second stepped gear 13 serving as a second shaft member, and includes a fixed arm 16a fixed to a frame member of the printer body or the like, and a movable arm 16b abutted against the cam portion 12e formed integrally with the first stepped gear 12. The torsion spring 16 and the cam portion 12e are configured such that the movable arm 16b presses the cam portion 12e toward an axis X2 of the first stepped gear 12, according to which the first stepped gear 12 is urged toward a standby position described later.

Figure 9A:
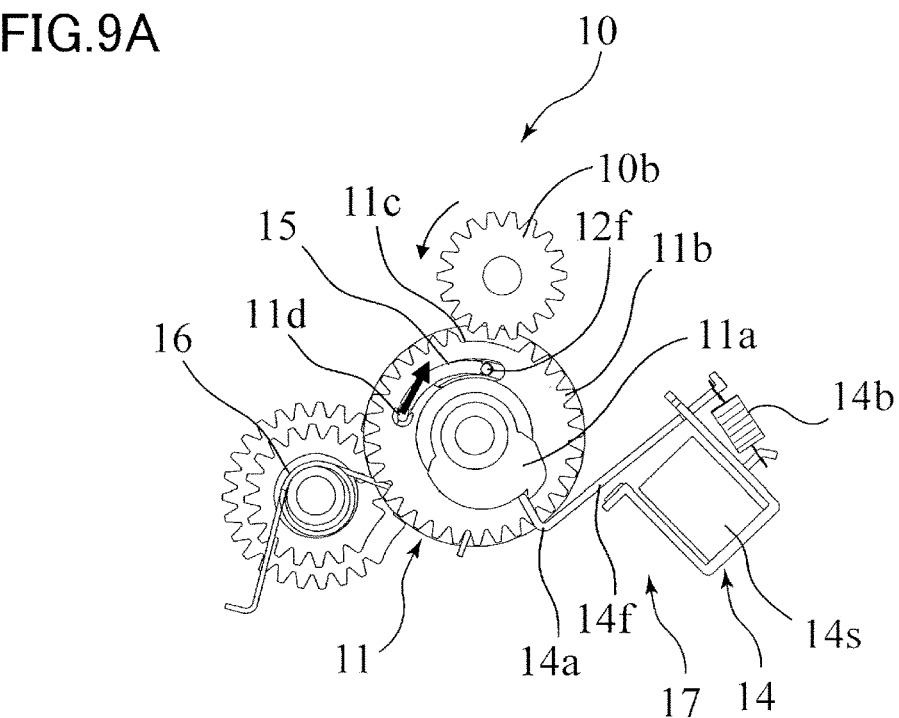
FIG. 9A is a side view illustrating a drive transmission apparatus in a standby state according to the first embodiment.

The drive transmission apparatus 10 having such rotation control mechanism 17 rotates the first stepped gear 12 for one rotation at a time, in order to have the sheet feeding portion 1 perform the sheet feeding operation. Hereafter, the operation of the drive transmission apparatus 10 in a state where the sheet feeding operation is performed will be described with reference to FIGS. 9A and 9B. FIG. 9A is a side view of the drive transmission apparatus 10 illustrating the state before the sheet feeding operation is started, and FIG. 9B is a side view of the drive transmission apparatus 10 illustrating a state in which the sheet feeding operation is performed halfway.

As illustrated in FIG. 9A, before the sheet feeding operation is started, the lock portion 11a of the trigger gear 11 is locked by the solenoid unit 14, and the non-toothed portion 11c of the trigger gear 11 is retained at a position opposed to the drive input gear 10b. The first stepped gear 12 is retained at a position where a non-toothed portion 12o of the driven gear 12a is opposed to the drive input gear 10b by the urging force of the torsion spring 16. Hereafter, the positions of the respective gears 11 and 12 in the standby state, that is, the positions of the trigger gear 11 and the first stepped gear 12 in which the non-toothed portions 11c and 12o are opposed to the drive input gear 10b are referred to as "standby positions". In a state where the trigger gear 11 and the first stepped gear 12 are positioned at the standby positions, the rotation of the drive input gear 10b is neither transmitted to the trigger gear 11 nor the first stepped gear 12. In this state, the trigger spring 15 is extended, and urges the trigger gear 11 in a clockwise direction in the drawing.

Figure 9B:
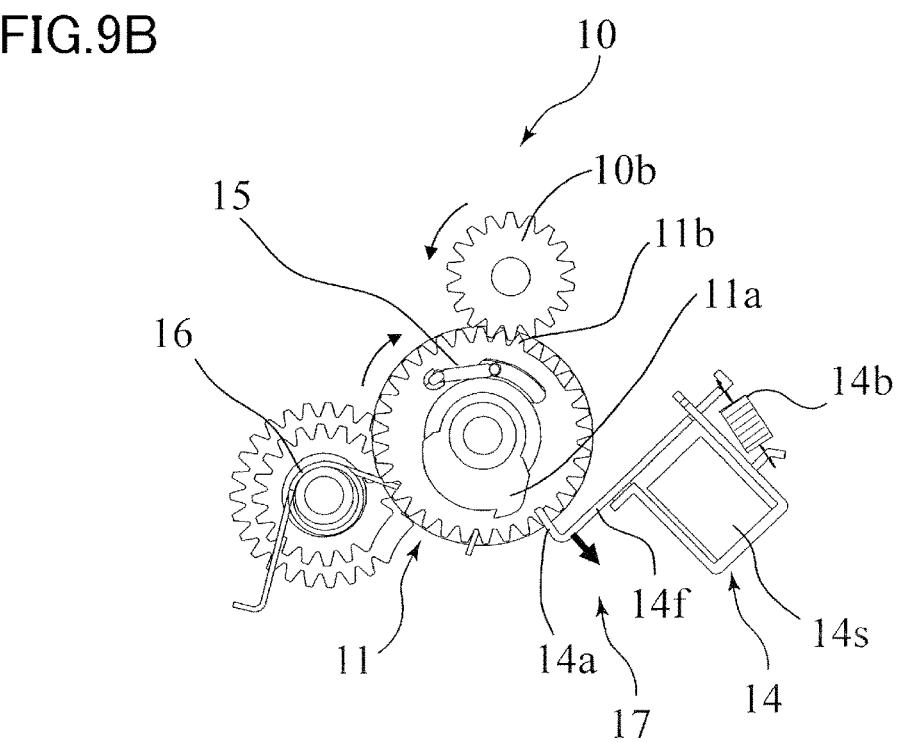
FIG. 9B is a side view illustrating the drive transmission apparatus after the sheet feeding operation has been started according to the first embodiment.

As illustrated in FIG. 9B, in a state where the sheet feeding operation is started, the solenoid unit 14 is energized. Then, the flap 14f is attracted to the solenoid 14s and the locking claw 14a is separated from the lock portion 11a of the trigger gear 11, and the trigger gear 11 is rotated in a counterclockwise direction in the drawing by the urging force of the trigger spring 15. Then, the toothed portion 11b of the trigger gear 11 is meshed with the drive input gear 10b, and the trigger gear 11 rotates by the driving force from the drive input gear 10b. The energizing of the solenoid 14s is stopped at a timing after the trigger gear 11 is meshed with the drive input gear 10b.

In a state where the trigger gear 11 is rotated for a predetermined amount (an angle corresponding to three teeth in the illustrated example), the key portions 12n and 12n and the key grooves 11f and 11f (refer to FIGS. 7A and 7B) are abutted, and the trigger gear 11 and the first stepped gear 12 start to rotate integrally. Then, the driven gear 12a of the first stepped gear 12 is meshed with the drive input gear 10b, and the first stepped gear 12 starts to receive the driving force from the drive input gear 10b. Thereafter, as described later, during a period until the first stepped gear 12 rotates once and the non-toothed portion 12o arrives again at the position opposed to the drive input gear 10b, the second stepped gear 13 is driven to rotate by the first stepped gear 12, and the driving force is output to the feed shaft 2a.

In a state where the trigger gear 11 rotates once and the non-toothed portion 11c arrives at a position opposed to the drive input gear 10b, the locking portion 11a is locked by the locking claw 14a of the solenoid unit in the non-energized state, and the trigger gear 11 stops at the standby position. Next, in a state where the first stepped gear 12 arrives at a position in which the non-toothed portion 12b is opposed to the drive input gear 10b, transmission of driving force from the drive input gear 10b is cancelled, and the trigger gear 11 is retained at the standby position by the urging force of the torsion spring 16. Then, during a period from when the trigger gear 11 is stopped to when the first stepped gear 12 is stopped, the trigger spring 15 will be in an extended state to prepare for the subsequent sheet feeding operation. As described, the drive transmission apparatus 10 switches the energized state and non-energized state of the solenoid 14s at an appropriate timing while rotating the drive input gear 10b, according to which a periodic operation is executed with one rotation of the first stepped gear 12 set as unit.

Gear Shift Operation by Drive Transmission Apparatus

Next, an operation of switching driving speed according to the drive transmission apparatus 10 will be described with reference to FIGS. 10 through 17. FIGS. 10 through 16 are pattern diagrams illustrating the positional relationship of the first stepped gear 12 and the second stepped gear 13 in the respective steps of the sheet feeding operation, wherein the figures denoted by the letter A are views taken from the same side as the feed roller 2 with respect to the width direction, and figures denoted by the letter B are views taken from the opposite side. FIG. 17 is a graph illustrating transition of rotational speed of the second stepped gear 13 in a state where the rotational speed of the first stepped gear 12 is set to 100 [rpm].

Figure 10A:
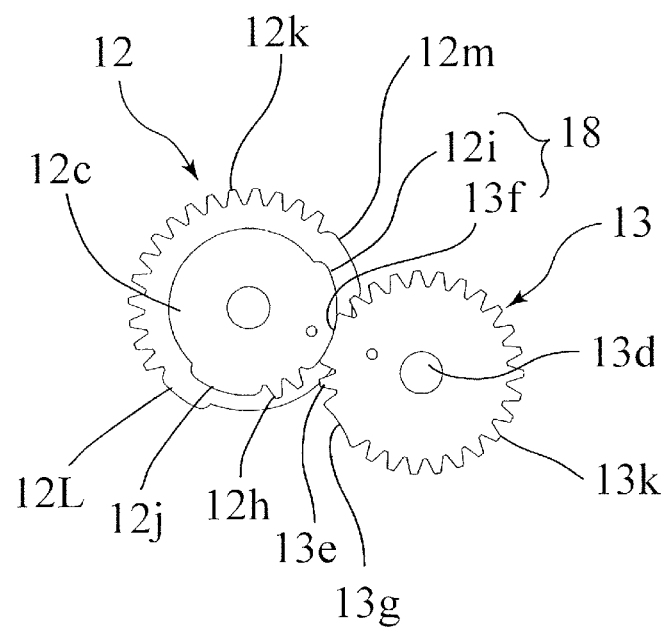
FIG. 10A is a pattern diagram illustrating the first and second stepped gears in the standby state according to the first embodiment.
Figure 10B:
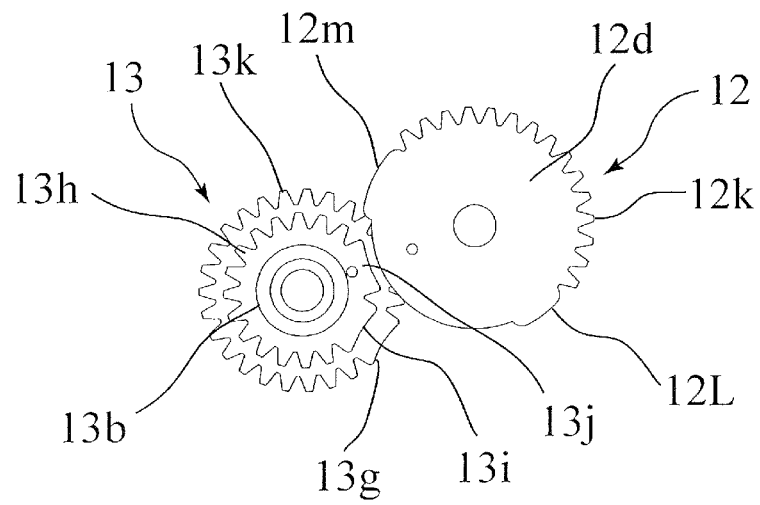
FIG. 10B is a pattern diagram illustrating the first and second stepped gears in the standby state according to the first embodiment.

As illustrated in FIG. 10A, in the standby state, that is, in a state where the first stepped gear 12 is at the standby position, the second stepped gear 13 is retained at a position where the first convex portion 12i of the first stepped gear 12 and the first concave portion 13f of the second stepped gear 13 are opposed to each other. In this state, the rotation of the second stepped gear 13 is regulated by the engagement of the first convex portion 12i and the first concave portion 13f. In the following description, the position of the second stepped gear 13 in the standby state is referred to as "home position".

Figure 11A:
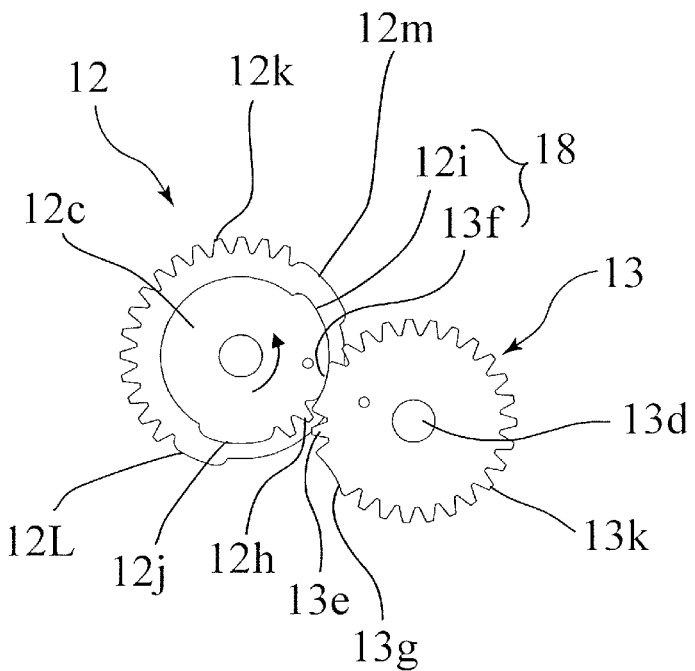
FIG. 11A is a pattern diagram illustrating the first and second stepped gears in a first step of the sheet feeding operation according to the first embodiment.
Figure 11B:
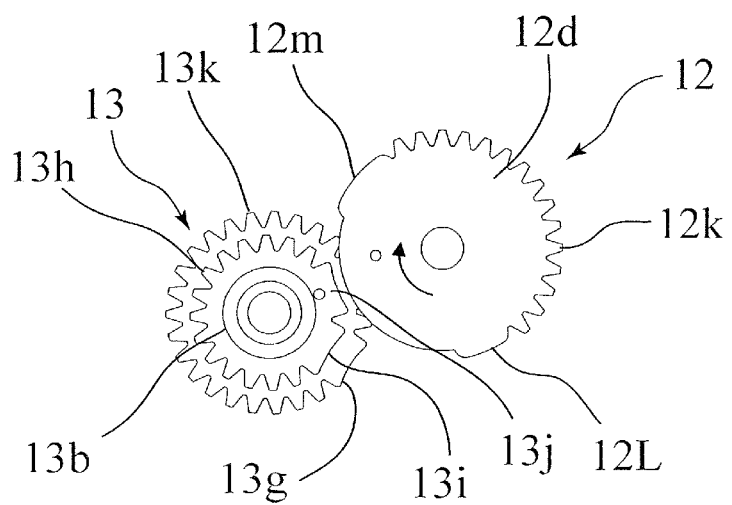
FIG. 11B is a pattern diagram illustrating the first and second stepped gears in a first step of the sheet feeding operation according to the first embodiment.

As illustrated in FIG. 11A, in a state where energization of the solenoid unit 14 and the rotation of the drive input gear 10b are started, the first stepped gear 12 starts to rotate from the standby position. Then the first convex portion 12i of the first stepped gear 12 is rotated while sliding against the first concave portion 13f of the second stepped gear 13, such that the second stepped gear 13 is continuously retained at the home position. In other words, by the engagement of the first convex portion 12i and the first concave portion 13f of a retention mechanism 18 in the present embodiment, the rotation angle of the second stepped gear 13 is retained at the home position in a state where rotation of the first stepped gear 12 is permitted. Then, if the toothed portion 12h of the small driving gear 12c reaches an end position of the first concave portion 13f, the toothed portion 12h of the small driving gear 12c is meshed with the toothed portion 13e of the large driven gear 13a arranged adjacent to the first concave portion 13f. Thereby, the second stepped gear 13 will be in a first driving state in which the second stepped gear 13 is driven to rotate at a rotational speed (i.e., first speed) in accordance with the transmission ratio (25/27) of the small driving gear 12c and the large driven gear 13a. Then, the feed shaft 2a starts to rotate along with the rotation of the output shaft 13d of the second stepped gear 13, and the elevating plate 5 starts to swing upward from the standby position.

Figure 12A:
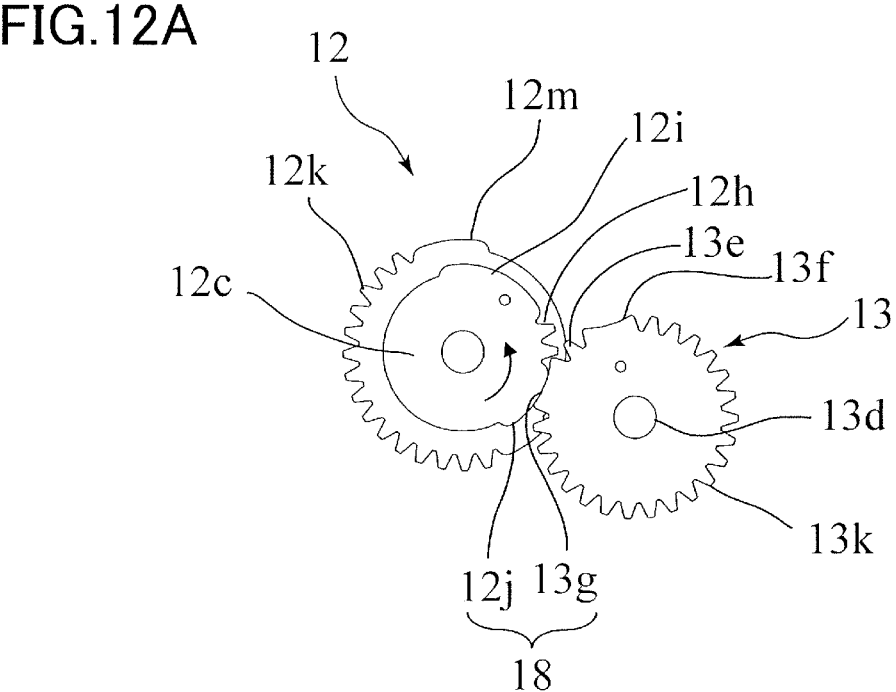
FIG. 12A is a pattern diagram illustrating the first and second stepped gears in a second step of the sheet feeding operation according to the first embodiment.
Figure 12B:
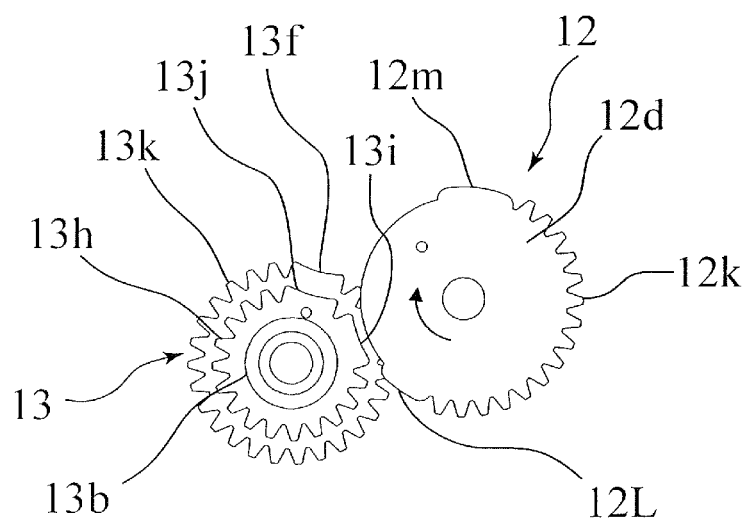
FIG. 12B is a pattern diagram illustrating the first and second stepped gears in the second step of the sheet feeding operation according to the first embodiment.

As illustrated in FIG. 12A, when the second stepped gear 13 rotates for a fixed angle (53.3 degrees in the illustrated example) in the first driving state, the toothed portion 12h of the small driving gear 12c will be unmeshed from the toothed portion 13e of the large driven gear 13a. Then the second convex portion 12j of the first stepped gear 12 engages with the second concave portion 13g of the second stepped gear 13, and slides against the second concave portion 13g. That is, the first stepped gear 12 rotates idly by the operation of the retention mechanism 18, and the second stepped gear 13 is retained at an intermediate stop position. Thereby, the second stepped gear 13 will be in a drive stop state in which the drive transmission from the first stepped gear 12 is cancelled at the sheet feed position of the elevating plate 5 (refer to FIG. 3A) or a position somewhat lower than the sheet feed position (hereinafter referred to as intermediate stop position).

Figure 13A:
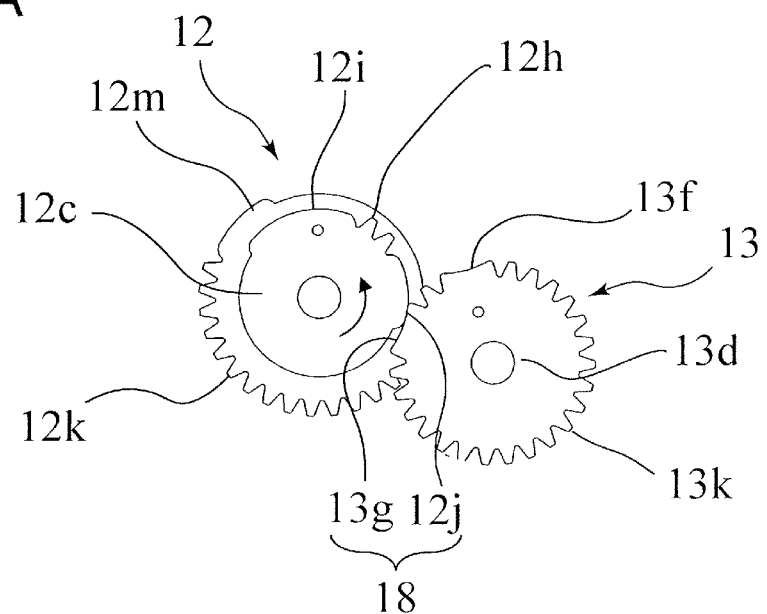
FIG. 13A is a pattern diagram illustrating the first and second stepped gears in a third step of the sheet feeding operation according to the first embodiment.
Figure 13B:
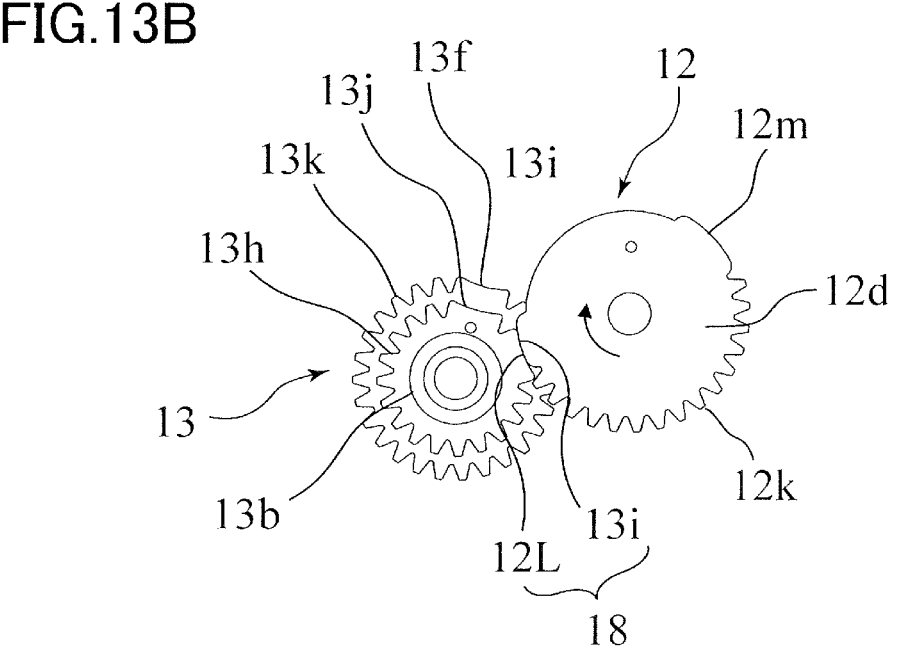
FIG. 13B is a pattern diagram illustrating the first and second stepped gears in the third step of the sheet feeding operation according to the first embodiment.

As illustrated in FIGS. 13A and 13B, along with the rotation of the first stepped gear 12, the third convex portion 12L is engaged with the third concave portion 13i subsequent to the second convex portion 12j and the second concave portion 13g, and moves in sliding motion with respect to the third concave portion 13i. Then, in a state where the toothed portion 12k of the large driving gear 12d reaches an end position of the third concave portion 13i, the toothed portion 12k of the large driving gear 12d is meshed with the toothed portion 13h of the small driven gear 13b arranged adjacent to the third concave portion 13i. Thereby, the second stepped gear 13 is changed from the drive stop state to a second driving state in which the second stepped gear 13 is driven by a rotation speed (i.e., second speed) in accordance with the transmission ratio (32/20) of the large driving gear 12d and the small driven gear 13b.

Figure 14A:
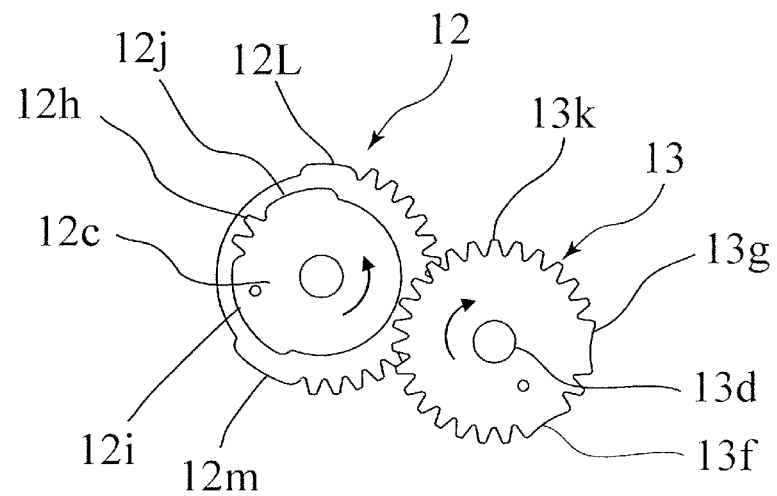
FIG. 14A is a pattern diagram illustrating the first and second stepped gears in a fourth step of the sheet feeding operation according to the first embodiment.
Figure 14B:
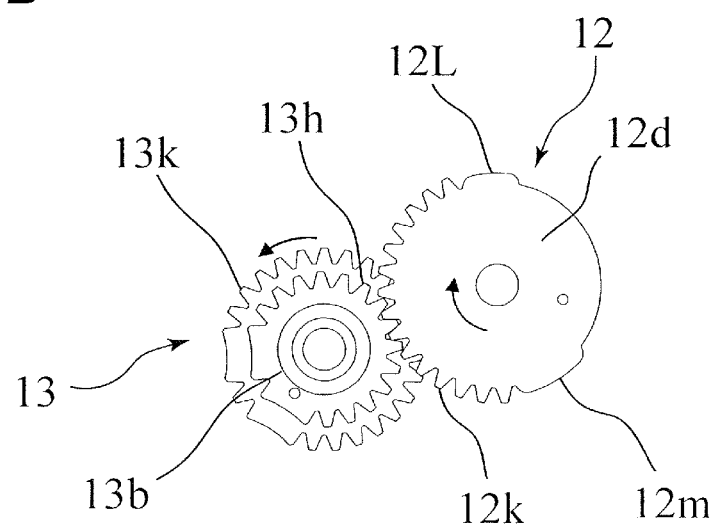
FIG. 14B is a pattern diagram illustrating the first and second stepped gears in the fourth step of the sheet feeding operation according to the first embodiment.

As illustrated in FIG. 14B, in a second driving state, the second stepped gear 13 is driven to rotate by the toothed portion 12k of the large driving gear 12d being meshed with the toothed portion 13h of the small driven gear 13b, and driving force is output to the feed shaft 2a. Thereby, the outer circumference portion of the feed roller 2 comes into contact with the upper surface of the sheet supported on the elevating plate 5 positioned at the sheet feed position and the feed roller 2 rotates, sending the uppermost sheet S1 to the sheet feeding direction (refer to FIG. 3B). Moreover, after the sheet feed operation by the feed roller 2 is performed, the elevating plate 5 is pressed down by the elevating cams 2b and 2c toward the standby position.

Figure 15A:
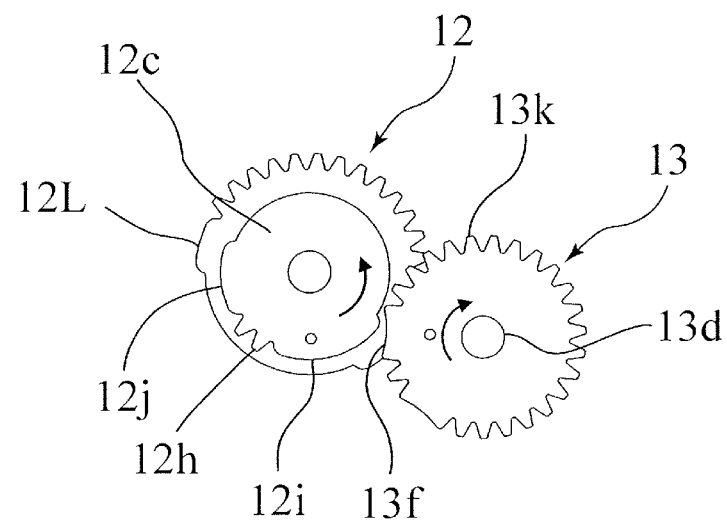
FIG. 15A is a pattern diagram illustrating the first and second stepped gears in a fifth step of the sheet feeding operation according to the first embodiment.
Figure 15B:
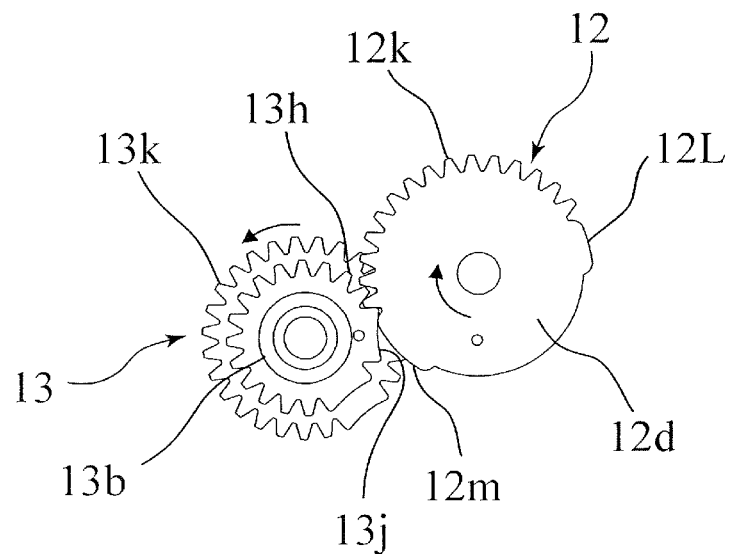
FIG. 15B is a pattern diagram illustrating the first and second stepped gears in the fifth step of the sheet feeding operation according to the first embodiment.

As illustrated in FIG. 15B, when the second stepped gear 13 rotates for a fixed angle (306.7 degrees in the illustrated example) in the second driving state, the second stepped gear 13 returns to the home position, and the toothed portion 12k of the large driving gear 12d is unmeshed from the toothed portion 13h of the small driven gear 13b. Then the fourth convex portion 12m of the first stepped gear 12 engages with the fourth concave portion 13j of the second stepped gear 13 and slides against the fourth concave portion 13j, and the first stepped gear 12 starts to rotate idly. Thus, in a state where the second stepped gear 13 is at the home position and the elevating plate 5 is retained at the standby position (refer to FIG. 2), the second stepped gear 13 will be in a drive stop state in which drive transmission is cancelled.

Figure 16A:
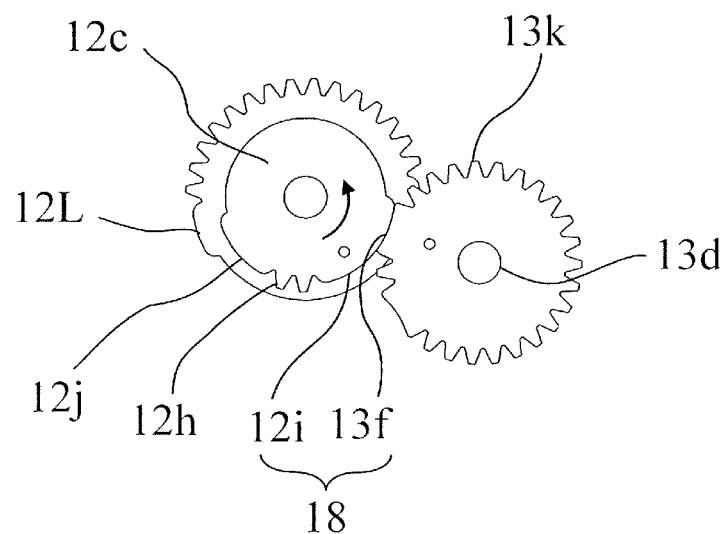
FIG. 16A is a pattern diagram illustrating the first and second stepped gears in a sixth step of the sheet feeding operation according to the first embodiment.
Figure 16B:
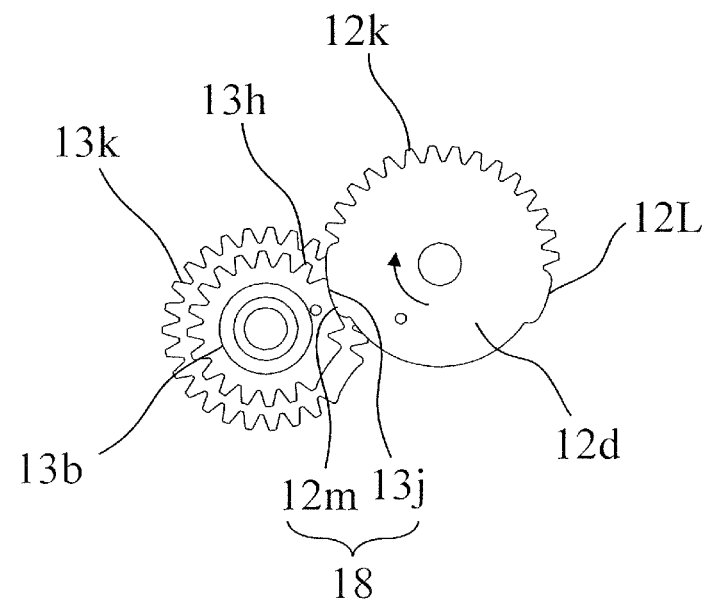
FIG. 16B is a pattern diagram illustrating the first and second stepped gears in the sixth step of the sheet feeding operation according to the first embodiment.
Figure 17:
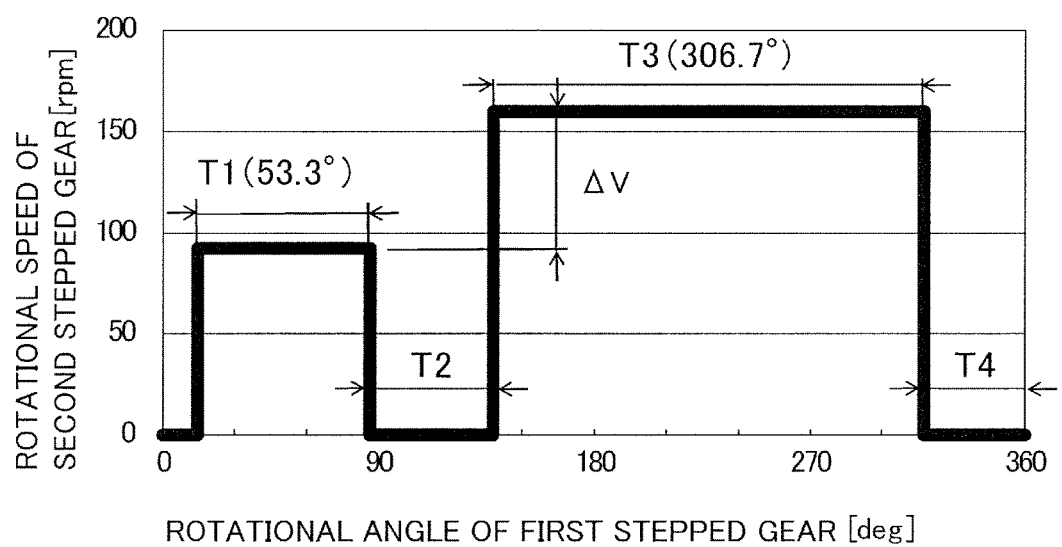
FIG. 17 is a graph illustrating a change in rotational speed of the second stepped gear when a feeding motor rotates at a fixed speed according to the first embodiment.

As illustrated in FIGS. 16A and 16B, along with the rotation of the first stepped gear 12, the first convex portion 12i is engaged with the first concave portion 13f subsequent to the fourth convex portion 12m and the fourth concave portion 13*j*, and moves in sliding motion with respect to the first concave portion 13*f*. Then, in a state where the first stepped gear 12 reaches the standby position, drive transmission from the drive input gear 10*b* to the first stepped gear 12 is cancelled, and the drive transmission apparatus 10 will be in a standby state (refer to FIGS. 10A and 10B).

As described, while the first stepped gear 12 rotates once by driving force provided from the drive input gear 10*b*, the drive transmission apparatus 10 is switched between a first driving state in which the second stepped gear 13 is driven by a first transmission ratio and a second driving state in which the second stepped gear 13 is driven by a second transmission ratio. Thereafter, while the second stepped gear 13 moves from the home position to the intermediate stop position and moves further from the intermediate stop position to the home position by rotating once, the elevating plate 5 performs one reciprocating swinging movement, and the feed roller 2 rotates once.

As illustrated in the graph of FIG. 17, after the sheet feeding operation is started, the drive transmission apparatus 10 will be in a first driving state in which the small driving gear 12*c* is meshed with the large driven gear 13*a*. During the first driving state period (T1), the first stepped gear 12 rotates the second stepped gear 13 for 53.3 degrees and moves the gear from the home position to the intermediate stop position. The rotational speed (i.e., first speed) of the second stepped gear 13 in the first driving state is determined by the transmission ratio (25/27) from the small driving gear 12*c* to the large driven gear 13*a*. That is, if the first stepped gear 12 is driven to rotate at 100 [rpm], the rotational speed of the second stepped gear 13 will be approximately 92.6 [rpm]. Thereafter, the second stepped gear 13 will be in a drive stop state, and the first stepped gear 12 will rotate idly for a predetermined period (T2).

Next, the drive transmission apparatus 10 will be in a second driving state in which the large driving gear 12*d* is meshed with the small driven gear 13*b*. The first stepped gear 12 rotates the second stepped gear 13 for 306.7 degrees (T3) during the second driving state (T3), and moves the second stepped gear 13 from the intermediate stop position to the home position. The rotational speed (i.e., second speed) of the second stepped gear 13 in the second driving state is determined by the transmission ratio (32/20) from the large driving gear 12*d* to the small driven gear 13*b*. That is, if the first stepped gear 12 is driven to rotate at 100 [rpm], the rotational speed of the second stepped gear 13 will be approximately 160 [rpm]. Thereafter, the second stepped gear 13 will be in a drive stop state, and the first stepped gear 12 will rotate idly for a predetermined period (T4), and then be retained at the standby position.

That is, the rotational speed of the output shaft 13*d* in a state (i.e., first driving state) where the elevating plate 5 is swung from the standby position to the sheet feed position is reduced in speed by approximately 42% compared to the rotational speed of the output shaft 13*d* when feeding the sheet to the feed roller 2 (i.e., second driving state). Thereby, impact and noise caused by the elevating plate 5 swung from the standby position to the sheet feed position are being stopped will be reduced without slowing down the sheet feed speed of the feed roller 2. Further, the deterioration of alignment of the sheets S supported on the elevating plate 5 will be suppressed. These effects can be expected similarly even if other switching mechanisms are used instead of the elevating cams 2*b* and 2*c*.

Now, in a configuration that enables to output a plurality of rotations having different rotation speeds with respect to the different driving objects, such as both rotating the feed roller and swinging the elevating plate by the driving force provided by the feeding motor, it may be considerable to change the rotation speed by controlling the output of the motor electrically. That is, a configuration can be considered in which the feeding motor is rotated at the first speed when swinging the elevating plate 5 from the standby position toward the sheet feed position, and the feeding motor is rotated at a second speed faster than the first speed when a sheet is fed by the sheet feed roller. According to such configuration, however, a control circuit configured to control the output of the feeding motor is required, and the productivity of the image forming apparatus may be deteriorated by the dispersion of timing at which the rotational speed of the motor is actually changed. On the other hand, according to the present embodiment, the rotational speed of the output shaft 13*d* can be changed at a highly accurate timing using a simple configuration.

Furthermore, since the switching of the first driving state and the second driving state is performed intermittently, it becomes possible to prevent two sets of toothed portions having different transmission ratios from being meshed at the same time, and in the drive stop state, the rotation angle of the second stepped gear 13 is retained by the retention mechanism 18 (refer to FIGS. 10 through 16). That is, the retention mechanism 18 is capable of retaining the second stepped gear 13 to a home position (i.e., a first rotation angle) corresponding to the standby position of the elevating plate 5, and to an intermediate stop position (i.e., second rotation angle) corresponding to the sheet feed position. Thereby, fluctuation of the rotation angle of the second stepped gear 13 in the drive stop state can be reduced, and smooth transition from the drive stop state to the first or second driving state of the drive transmission apparatus 10 is enabled. In other words, the stability of operation of the drive transmission apparatus 10 can be improved by the operation of the retention mechanism 18.

Further, it is also possible to consider a configuration for preventing fluctuation of the rotation angle of the second stepped gear 13 during gear shift, by arranging an urging member such as a spring configured to urge the second stepped gear 13 to a fixed direction of rotation, and switching from a certain driving state to a subsequent driving state in a short time. According to such configuration, however, the second stepped gear 13 will be meshed with the toothed portion of the first stepped gear 12 in a state urged by the urging member, such that the collision between toothed portions may cause noise or tooth damage. In contrast, according to the present embodiment, since the meshing of toothed portions of the first stepped gear 12 and the second stepped gear 13 will be started in a state where the toothed portion of the second stepped gear 13 is retained at an appropriate position by the operation of the retention mechanism, such inconvenience can be prevented.

Modified Examples

In the present embodiment, an example has been described assuming that rotation output from the drive transmission apparatus 10 by two sets of gears having different transmission ratios and is shifted between two speeds, but a configuration can be adopted in which three or more speeds are available by adopting three or more sets of gears. According further to the present embodiment, a configuration is adopted in which the rotation angle of the second stepped gear 13 is retained by the retention mechanism 18 in both the drive stop state from the first driving state to the second driving state and in the drive stop state from the second driving state to the first driving state. That is, convex portions 12*j* and 12L and corresponding concave portions 13*g* and 13*i* correspond to first protruded portions and first recessed portions, and convex portions 12*i* and 12*m* and corresponding concave portions 13*f* and 13*j* correspond to second protruded portions and second recessed portions. It is noted that a similar advantage as the present embodiment will be obtained by a configuration in which the protruded portion and recessed portion of the retention mechanism are engaged in even one of these drive stop states.

Further, the protruded portion and the recessed portion constituting the retention mechanism is not restricted to the above-described arrangement, as long as the protruded portion and the recessed portion are integrally rotated with the first and second rotating units and arranged to be engaged at an appropriate rotational phase. The present embodiment was described assuming that the convex portions 12*i*, 12*j*, 12L and 12*m* serving as protruded portions and concave portions 13*f*, 13*g*, 13*i* and 13*j* serving as recessed portions are formed on non-toothed portions of the partially toothed gears (12*c*, 12*d*, 13*a* and 13*b*). However, for example, the first and second protruded portions may be arranged on either one of the partially toothed gears, instead of arranging the first and second protruded portions on each of the two partially toothed gears. In that case, the first and second recessed portions should be arranged on the driven gear corresponding to the drive gear on which the protruded portion is provided. The protruded portion is approximately formed in a circular arc shape, but the recessed portion is not necessarily recessed in a circular arc shape, as long as the rotation around a rotational axis of the second rotating unit is regulated in a state where the recessed portion is engaged with the protruded portion.

Further, for example, the drive gear, the protruded portion and the driven gear, and the recessed portion can be formed as independent members that are integrally rotated, such as by providing a convex portion directly to the shaft portion 12*g* of the first stepped gear 12. Note that by the protruded portion and the recessed portion being arranged on the non-toothed portion as according to the present embodiment, the drive transmission apparatus can be formed in a compact manner. Further, instead of adopting a configuration where the first and second driving gears are provided as independent gear members, that is, gears constituting the stepped gear, it is possible to use a single gear member in which fan-shaped first and second driving gears having different pitch radii are arranged at different ranges in rotation angle.

Second Embodiment

Next, a drive transmission apparatus 20 according to the second embodiment will be described with reference to FIGS. 18 through 27. Compared to the drive transmission apparatus 10 according to the first embodiment, the drive transmission apparatus 20 according to the present embodiment includes a first stepped gear 22 and a second stepped gear 23 having different shapes from the first embodiment. Other components commonly used in the first embodiment are denoted with the same reference numbers as the first embodiment, and descriptions thereof are omitted.

Figure 18:
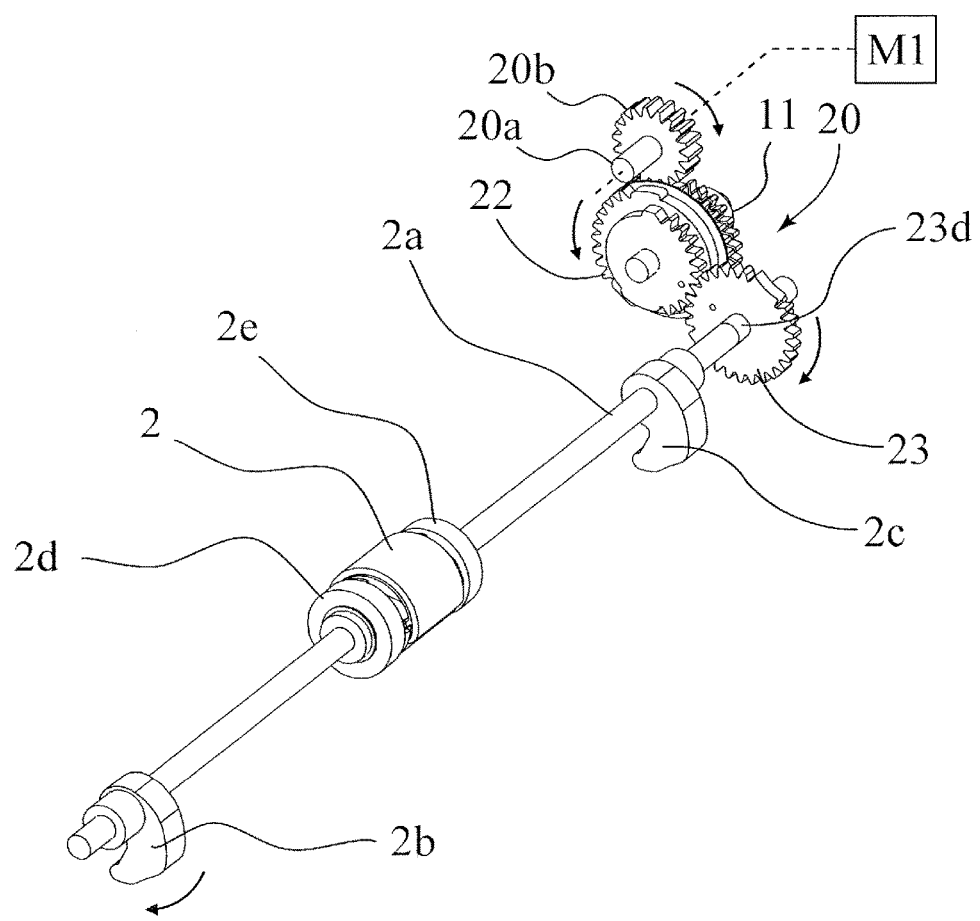
FIG. 18 is a perspective view focused on a portion of a drive transmission apparatus and a sheet feeding portion according to a second embodiment.

As illustrated in FIG. 18, the drive transmission apparatus 20 according to the present embodiment should preferably be used as a transmission mechanism configured to transmit driving force from the feeding motor M1 to the feed roller 2 and the elevating cams 2*b* and 2*c* of the sheet feeding portion, for example. The drive transmission apparatus 20 includes an input shaft 20*a* directly or indirectly connected to the feeding motor M1 and an output shaft 23*d* connected to the feed shaft 2*a*, and transmits the driving force of the feeding motor M1 to the feed shaft 2*a*.

Figure 19A:
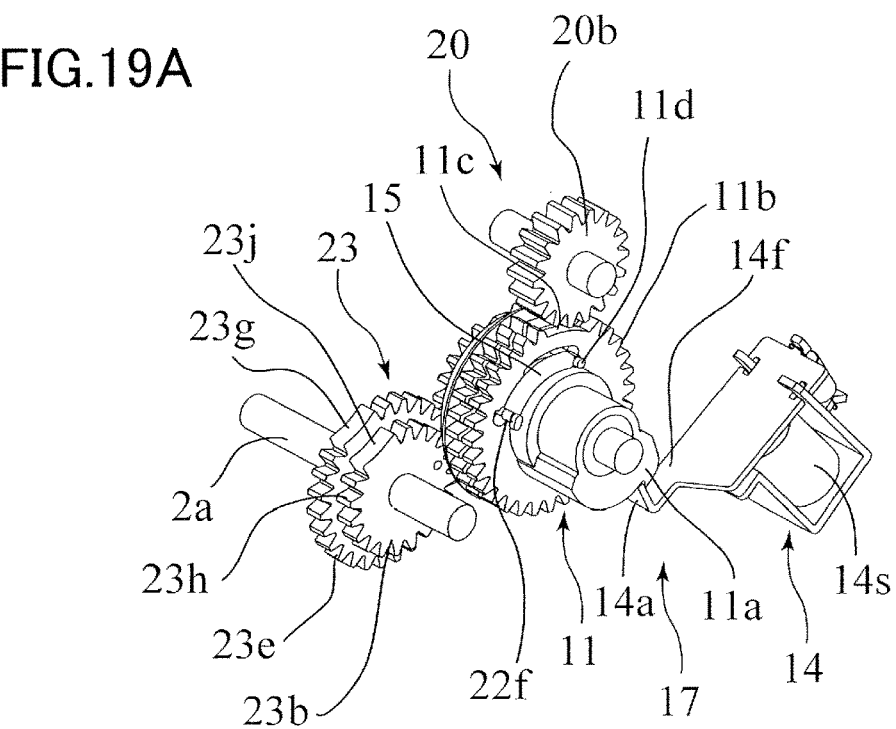
FIG. 19A is a perspective view illustrating the drive transmission apparatus according to the second embodiment.
Figure 19B:
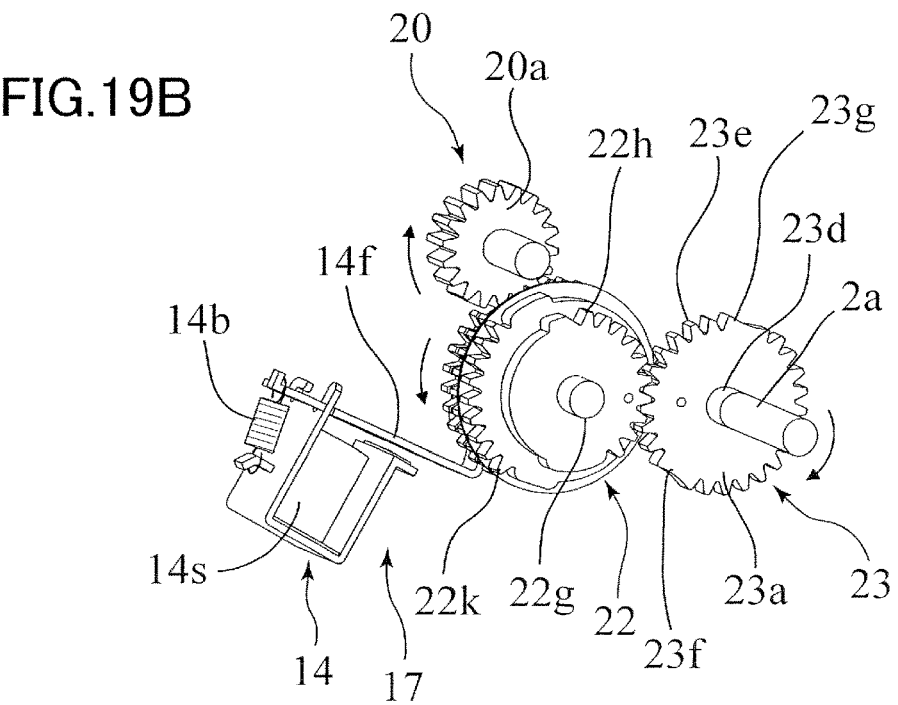
FIG. 19B is a perspective view illustrating the drive transmission apparatus according to the second embodiment.
Figure 20:
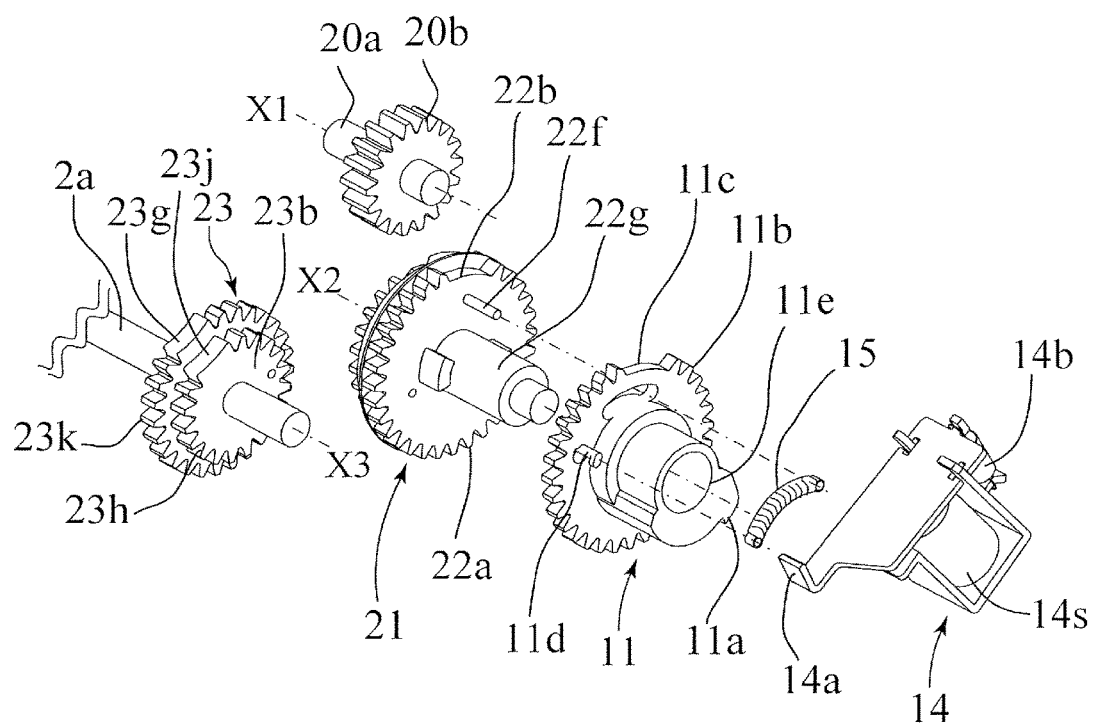
FIG. 20 is an exploded view of the drive transmission apparatus according to the second embodiment.
Figure 21A:
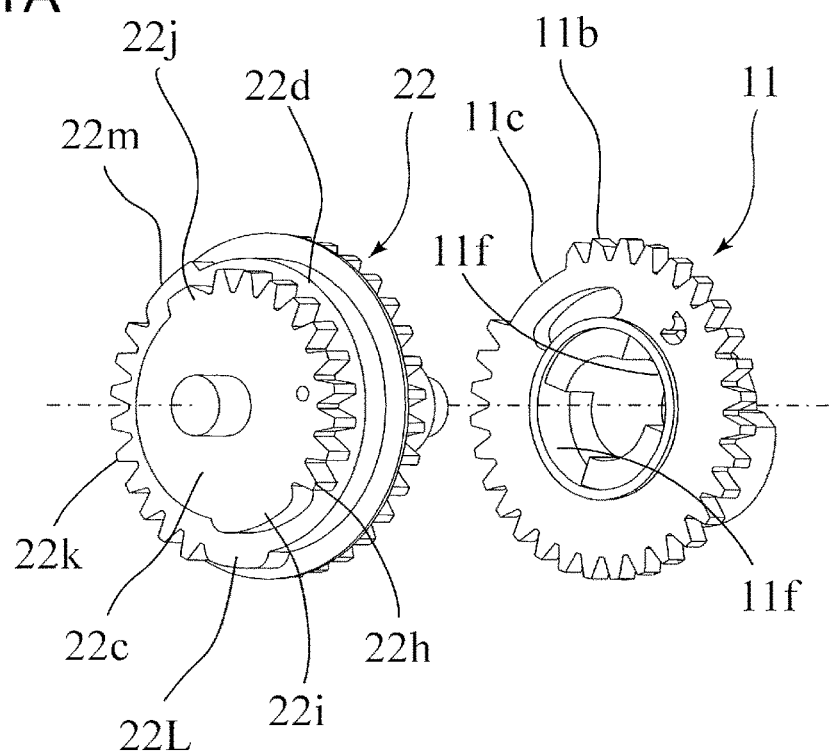
FIG. 21A is an exploded view of a trigger gear and a first stepped gear according to the second embodiment.
Figure 21B:
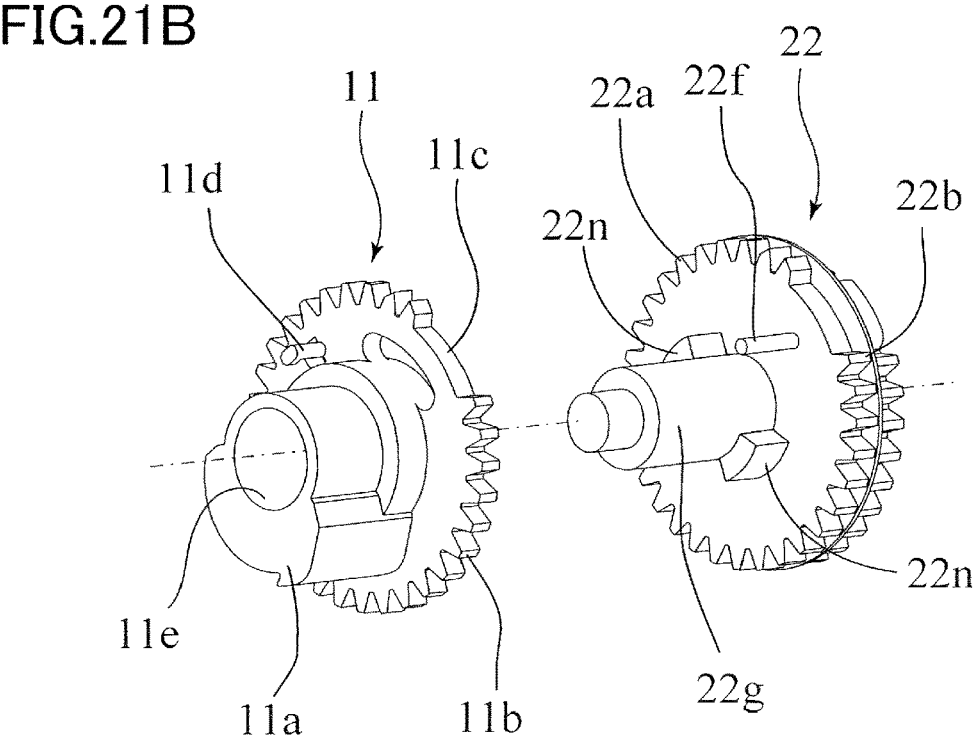
FIG. 21B is an exploded view of the trigger gear and the first stepped gear according to the second embodiment.
Figure 22A:
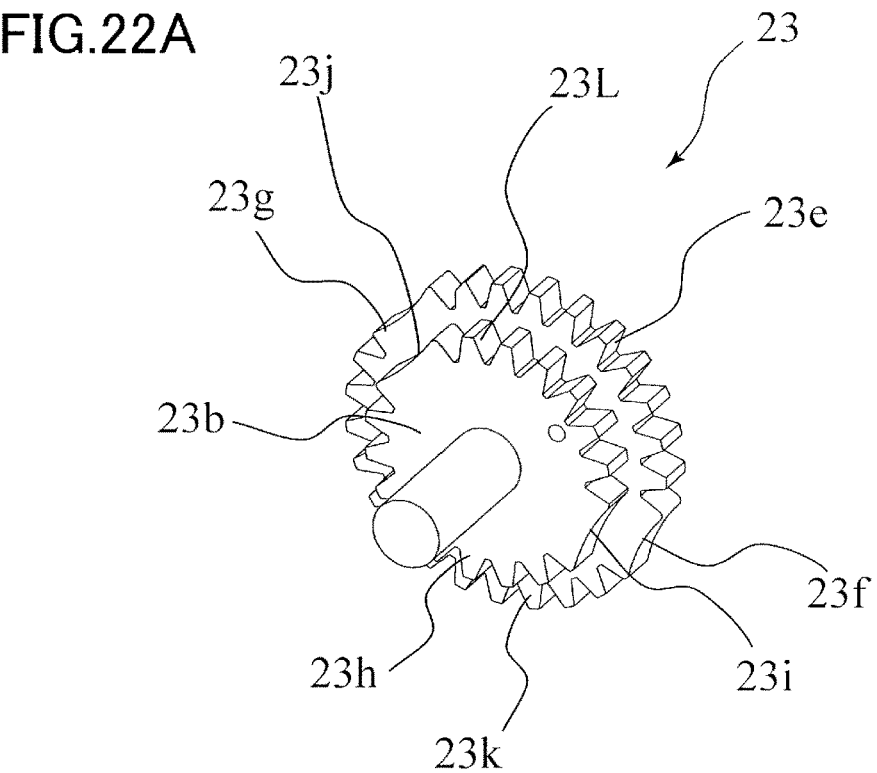
FIG. 22A is a perspective view of a second stepped gear according to the second embodiment.
Figure 22B:
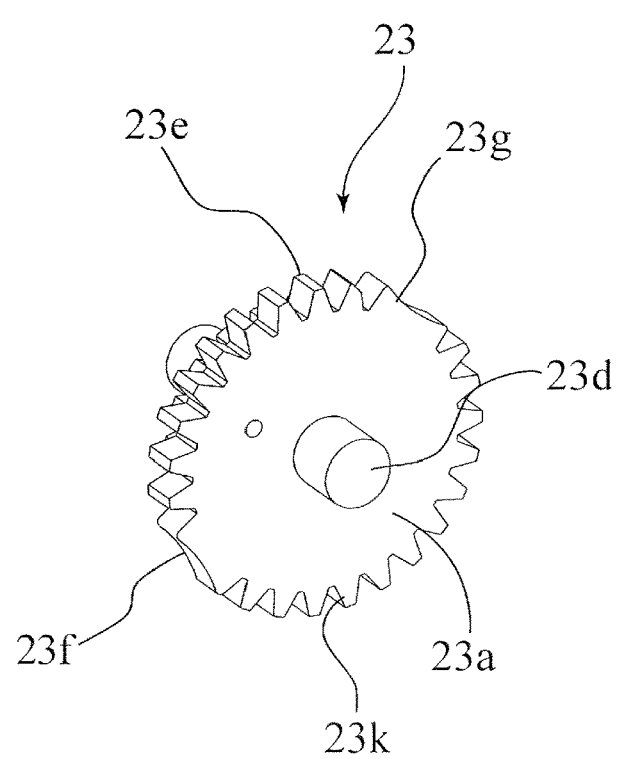
FIG. 22B is a perspective view of the second stepped gear according to the second embodiment.

FIG. 19A is a perspective view of the drive transmission apparatus 20 taken from a depth side of the printer body, and FIG. 19B is a perspective view of the drive transmission apparatus 20 taken from the opposite side as FIG. 19A. FIG. 20 is an exploded view of the drive transmission apparatus 20. FIGS. 21A and 21B are exploded views illustrating the trigger gear 11 and the first stepped gear 22 of the drive transmission apparatus 20. FIGS. 22A and 22B are perspective views illustrating the second stepped gear 23 of the drive transmission apparatus 20.

As illustrated in FIGS. 19A and 19B, the drive transmission apparatus 20 includes a drive input gear 20*b*, the trigger gear 11, the first stepped gear 22, the second stepped gear 23, the solenoid unit 14, and the trigger spring 15. The drive input gear 20*b*, the first stepped gear 22 and the second stepped gear 23 constitute a drive transmitting path for transmitting the rotation of the input shaft 20*a* to the output shaft 23*d*.

As illustrated in FIG. 20, the drive input gear 20*b* is mounted to the input shaft 20*a*, and integrally rotates with the input shaft 20*a*. The trigger gear 11 and the first stepped gear 22 are both rotary members rotatable around the rotational axis X2 that is parallel with the rotational axis X1 of the drive input gear 20*b*. Further, the second stepped gear 23 is a rotating member rotatable around the rotational axis X3 that is parallel with the rotational axes X1 and X2.

As illustrated in FIGS. 21A and 21B, the first stepped gear 22 corresponding to the first rotating unit includes a shaft portion 22*g*, a driven gear 22*a* meshed with the drive input gear 20*b*, a small driving gear 22*c* corresponding to the first driving gear, and a large driving gear 22*d* corresponding to the second driving gear. The driven gear 22*a*, the small driving gear 22*c* and the large driving gear 22*d* rotate integrally with the shaft portion 22*g*.

The driven gear 22*a*, the small driving gear 22*c* and the large driving gear 22*d* are all so-called partially toothed gears in which toothed portions 22*b*, 22*h* and 22*k* are formed partially in the circumferential direction. A first convex portion 22*i* and a second convex portion 22*j* having an outer surface with the same shape as the pitch circle of a toothed portion 22*h* are provided on both sides of the toothed portion 22*h* in the circumferential direction on the non-toothed portion of the small driving gear 22*c*. Further, a third convex portion 22L and a fourth convex portion 22*m* having an outer surface with the same shape as the pitch circle of a toothed portion 22*k* are provided on both sides of the toothed portion 22*k* in the circumferential direction on the non-toothed portion of the large driving gear 22*d*.

As illustrated in FIGS. 22A and 22B, the second stepped gear 23 corresponding to the second rotating unit includes a large driven gear 23*a* that meshes with the small driving gear 22*c*, and a small driven gear 23*b* that meshes with the large driving gear 22*d*. The large driven gear 23*a* serving as the second driven gear includes a toothed portion 23*e* that meshes with the toothed portion 22*h* of the small driving gear 22*c*. The small driven gear 23*b* serving as the second driven gear is meshed with a toothed portion 23*h* that meshes with the toothed portion 22*k* of the large driving gear 22*d*. The large driven gear 23*a* and the small driven gear 23*b* are integrally rotated with the output shaft 23*d*.

The large driven gear 23*a* and the small driven gear 23*b* are both so-called chipped toothed gears in which toothed portions 23e and 23h are formed to a portion in the circumferential direction. A first concave portion 23f and a second concave portion 23g which are concave portions having a curvature approximately equal to the pitch circle of the small driving gear 22c are provided on both sides in the circumferential direction of the toothed portion 23e in the non-toothed portion of the large driven gear 23a. Further, a third concave portion 23i and a fourth concave portion which are concave portions having a curvature approximately equal to the pitch circle of the large driving gear 22d are provided on both sides in the circumferential direction of the toothed portion 23h of the non-toothed portion of the small driven gear 23b. That is, the first concave portion 23f, the second concave portion 23g, the third concave portion 23i and the fourth concave portion 23j of the second stepped gear 23 are respectively engageable with the first convex portion 22i, the second convex portion 22j, the third convex portion 22L and the fourth convex portion 22m of the first stepped gear 22. In other words, the respective sets of convex and concave portions described above are examples of protruded and recessed portions respectively constituting a retention mechanism.

The transmission ratio of the small driving gear 22c and the large driven gear 23a are set to different values as the transmission ratio of the large driving gear 22d and the small driven gear 23b. In other words, a first transmission ratio corresponding to a gear ratio of the small driving gear 22c and the large driven gear 23a is set relatively low, and a second transmission ratio corresponding to a gear ratio of the large driving gear 22d and the small driven gear 23b is set relatively high.

In the illustrated example, the toothed portion 22h of the small driving gear 22c is composed of ten teeth formed at a pitch corresponding to a 25-teeth cogwheel, and the toothed portion 23e of the large driven gear 23a is composed of nine teeth with ten tooth grooves formed at a pitch corresponding to a 27-teeth cogwheel. Therefore, the transmission ratio of the small driving gear 22c to the large driven gear 23a is 25/27. Meanwhile, the toothed portion 22k of the large driving gear 22d is composed of nine teeth formed at a pitch corresponding to a 32-teeth cogwheel, and the toothed portion 23h of the small driven gear 23b is composed of eight teeth with nine tooth grooves formed at a pitch corresponding to a 20-teeth cogwheel. Therefore, the transmission ratio of the large driving gear 22d to the small driven gear 23b is 32/20.

Toothed portions 23k and 23L that are not usually involved with drive transmission are provided on the large driven gear 23a and the small driven gear 23b. In the following description, output of driving force from the second stepped gear 23 to the drive target is performed via the output shaft 23d, but it is also possible to adopt a configuration where the toothed portions 23k and 23L are connected to and drive another object.

As illustrated in FIGS. 19A and 19B, the drive transmission apparatus 20 includes the rotation control mechanism 17 including the trigger gear 11, the solenoid unit 14 and the trigger spring 15 as a mechanism capable of controlling the rotation of the first stepped gear 22. The configuration of the rotation control mechanism 17 is similar to the first embodiment, so that the description thereof will be omitted. Similar to the first embodiment, the rotation control mechanism 17 can control the operation of the drive transmission apparatus 20 with one rotation of the first stepped gear 22 set as a unit by controlling the energization of the solenoid unit 14.

Gear Shift Operation by Drive Transmission Apparatus

The operation for switching the driving speed according to the drive transmission apparatus 20 of the present embodiment will be described with reference to FIGS. 23 through 26. FIGS. 23 through 26 are pattern diagrams illustrating the positional relationship of the first stepped gear 22 and the second stepped gear 23 in the respective steps of the sheet feeding operation, wherein the figures denoted by the letter A are views taken from the same side as the feed roller 2 with respect to the width direction, and the figures denoted by the letter B are views taken from the opposite side thereof. FIG. 27 is a graph illustrating transition of rotational speed of the second stepped gear 23 in a state where the rotation speed of the first stepped gear 22 is set to 100 [rpm].

Figure 23A:
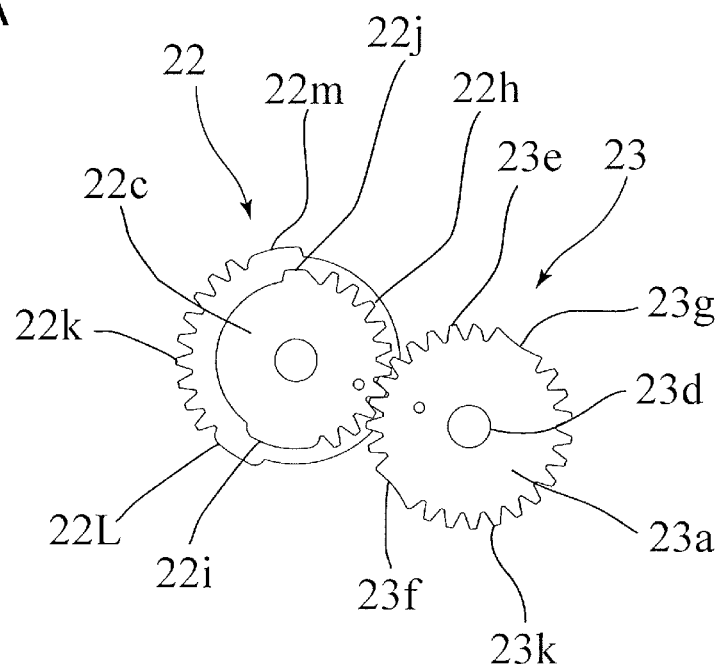
FIG. 23A is a pattern diagram illustrating the first and second stepped gears in a standby state according to the second embodiment.
Figure 23B:
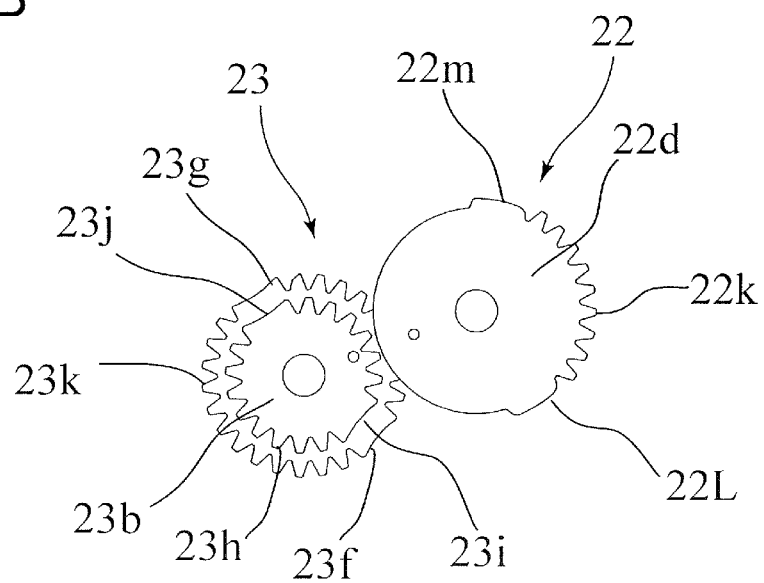
FIG. 23B is a pattern diagram illustrating the first and second stepped gears in the standby state according to the second embodiment.

As illustrated in FIG. 23A, according to the present embodiment, the toothed portion 22h of the small driving gear 22c and the toothed portion 23e of the large driven gear 23a are configured to be meshed in the standby state. In this state, the rotation of the second stepped gear 23 is restricted by the first stepped gear 22 retained at the standby position by the operation of the rotation control mechanism 17. Hereinafter, the position of the second stepped gear 23 in the standby state is referred to as the home position in the present embodiment. In a state where the second stepped gear 23 is at the home position, the elevating plate 5 is retained at the standby position (refer to FIG. 2).

Figure 24A:
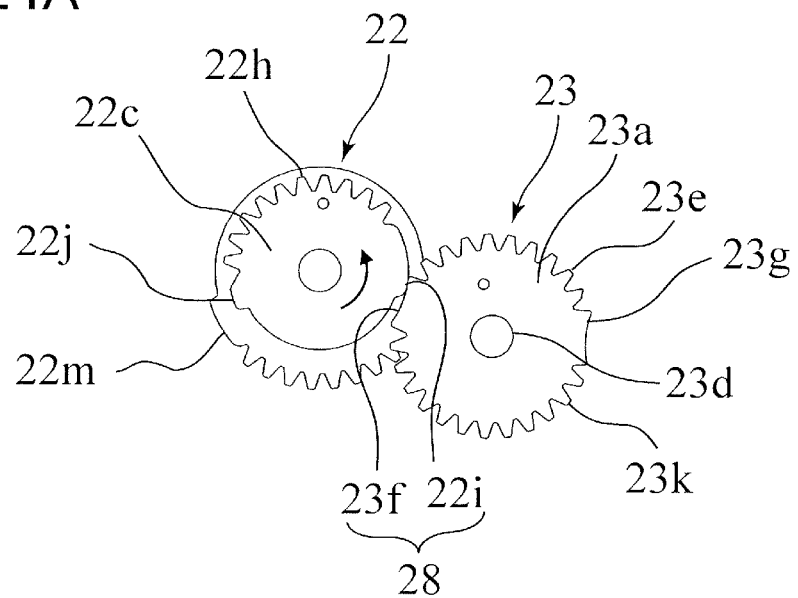
FIG. 24A is a pattern diagram illustrating the first and second stepped gears in a first step of a sheet feeding operation according to the second embodiment.

As illustrated in FIG. 24A, in a state where energization of the solenoid unit 14 and the rotation of the drive input gear 20b are started, the first stepped gear 22 starts to rotate from the standby position. Thereby, the second stepped gear 23 will be in a first driving state in which the second stepped gear 23 is driven to rotate at a rotational speed (i.e., first speed) in accordance with the transmission ratio (25/27) of the small driving gear 22c and the large driven gear 23a. Then, the feed shaft 2a starts to rotate along with the rotation of the output shaft 23d of the second stepped gear 23, and the elevating plate 5 starts to swing upward from the standby position.

Figure 24B:
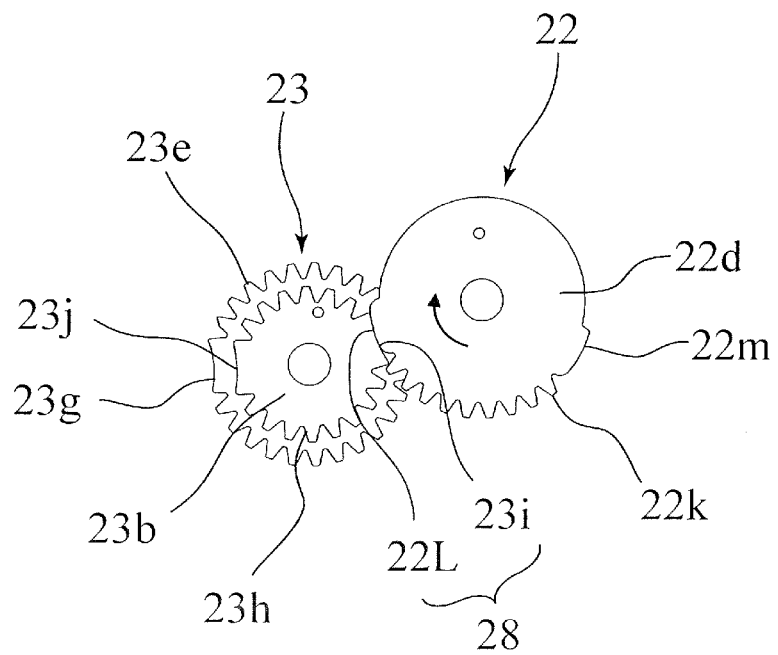
FIG. 24B is a pattern diagram illustrating the first and second stepped gears in the first step of the sheet feeding operation according to the second embodiment.

As illustrated in FIG. 24A, if the second stepped gear 23 rotates for a certain angle (60 degrees in the illustrated example) in the first driving state, the toothed portion 22h of the small driving gear 22c separates from the toothed portion 23e of the large driven gear 23a. Then the first convex portion 22i of the first stepped gear 22 engages with the first concave portion 23f of the second stepped gear 23 and slides with respect to a second concave portion 23f that engages with the first concave portion 23f, by which the first stepped gear 22 rotates idly. Thereby, in a state where the second stepped gear 23 is retained at a first stop position corresponding to the state where the elevating plate 5 is retained at the sheet feed position (refer to FIG. 3A), the second stepped gear 23 is in a drive stop state where drive transmission from the first stepped gear 22 is cancelled. Further, as illustrated in FIG. 24B, along with the rotation of the first stepped gear 22, subsequent to the first convex portion 22i and the first concave portion 23f, the third convex portion 22L engages with the third concave portion 23i and starts to slide against the third concave portion 23i. The convex portions 22i and 22L correspond to the first protruded portion constituting a retention mechanism 28 in the present invention, and the concave portions 23f and 23i correspond to the first recessed portion.

Figure 25A:
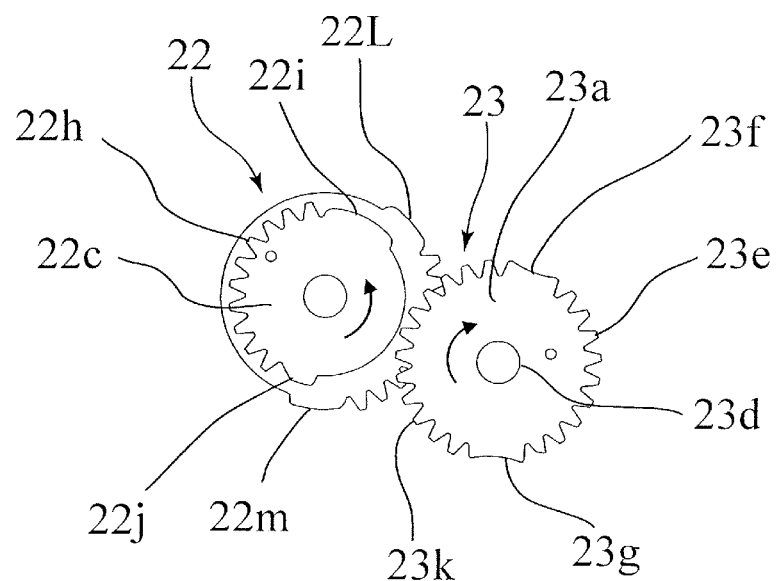
FIG. 25A is a pattern diagram illustrating the first and second stepped gears in a second step of the sheet feeding operation according to the second embodiment.
Figure 25B:
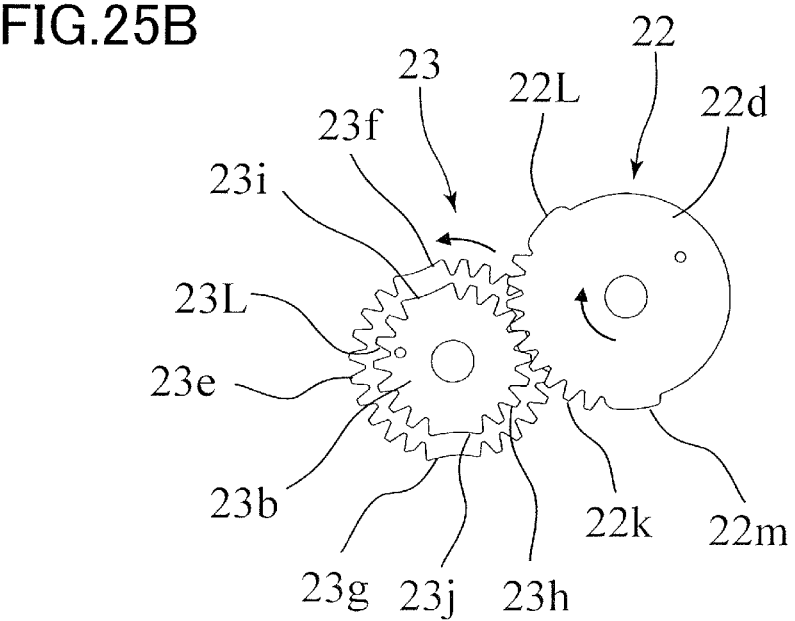
FIG. 25B is a pattern diagram illustrating the first and second stepped gears in the second step of the sheet feeding operation according to the second embodiment.
Figure 26A:
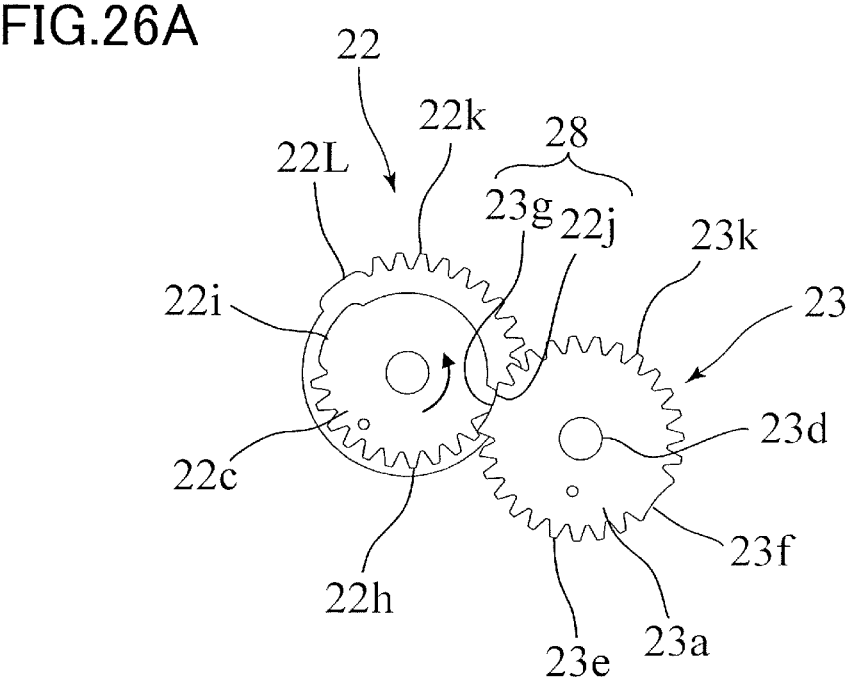
FIG. 26A is a pattern diagram illustrating the first and second stepped gears in a third step of the sheet feeding operation according to the second embodiment.

Thereafter, as illustrated in FIG. 25B, in a state where the toothed portion 22k of the large driving gear 22d is meshed with the toothed portion 23h of the small driven gear 23b, the second stepped gear 23 will be in a second driving state in which the second stepped gear 23 is driven at a rotational speed (i.e., second speed) in accordance with the speed transmission ratio (32/20) of the large driving gear 22*d* and the small driven gear. Thereby, driving force is transmitted from the output shaft 23*d* of the second stepped gear 23 to the feed shaft 2*a*, the feed roller 2 rotates, and sends out the sheet S supported on the elevating plate 5 (refer to FIG. 3B).

Figure 26B:
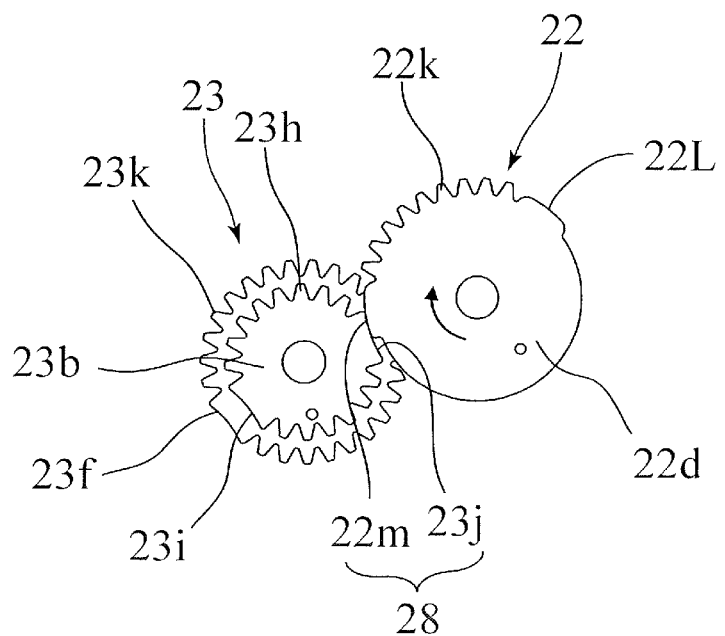
FIG. 26B is a pattern diagram illustrating the first and second stepped gears in the third step of the sheet feeding operation according to the second embodiment.
Figure 27:
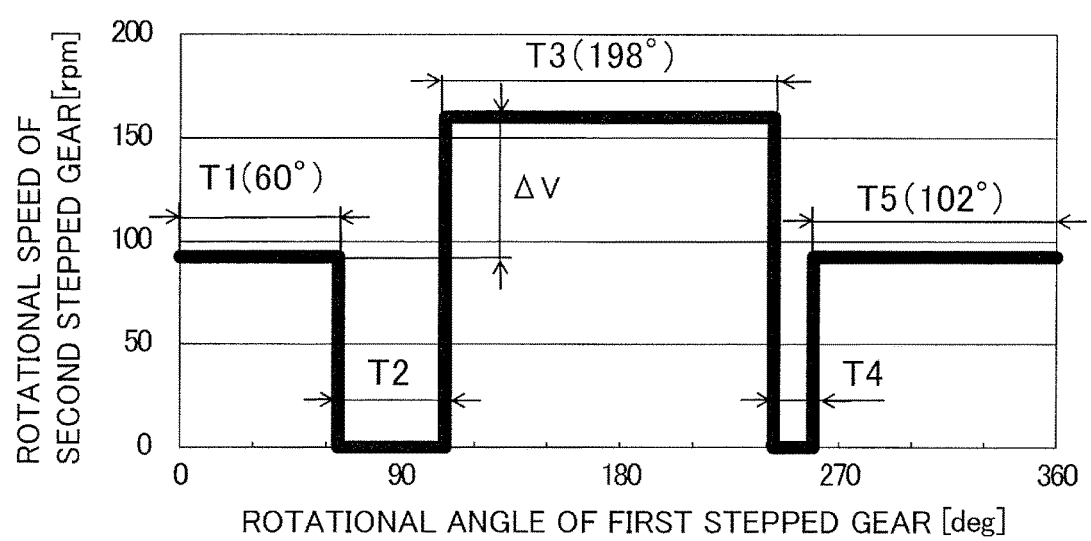
FIG. 27 is a graph illustrating a change of rotational speed of the second stepper gear when a feeding motor rotates at a fixed speed according to the second embodiment.

As illustrated in FIG. 26B, in a state where the second stepped gear 23 rotates for a fixed angle (198 degrees in the illustrated example) by the second driving state, the toothed portion 22*k* of the large driving gear 22*d* separates from the toothed portion 23*h* of the small driven gear 23*b*. Then the fourth convex portion 22*m* of the first stepped gear 22 engages with the fourth concave portion 23*j* of the second stepped gear 23, and the fourth convex portion 22*m* slides against the fourth concave portion 23*j*, according to which the first stepped gear 22 rotates idly. Thereby, the elevating plate 5 is retained at the sheet feed position, and the second stepped gear 23 will be in a drive stop state in which the drive transmission of the second stepped gear 23 is cancelled in a state where the second stepped gear 23 is retained at a second stop position illustrated in FIGS. 26A and 26B. As illustrated in FIG. 26A, along with the rotation of the first stepped gear 22, subsequent to the fourth convex portion 22*m* and the fourth concave portion 23*j*, the second convex portion 22*j* will be engaged with the second concave portion 23*g* and slides against the second concave portion 23*g*. These convex portions 22*j* and 22*m* correspond to the second protruded portion constituting the retention mechanism 28, and the concave portions 23*g* and 23*j* correspond to the second recessed portion.

Thereafter, if the first stepped gear 22 rotates for a remaining angle to complete one rotation (102 degrees in the illustrated example), the toothed portion 22*h* of the small driving gear 22*c* is meshed again with the toothed portion 23*e* of the large driven gear 23*a*. Thereby, the second stepped gear 23 will be in a third driving state, and the elevating plate 5 will be pushed down to the standby position by the cams 2*b* and 2*c*. Then, in a state where the first stepped gear 22 reaches the standby position again, drive transmission from the drive input gear 20*b* to the first stepped gear 22 is cancelled and the drive transmission apparatus 20 will be in a standby state (refer to FIGS. 23A and 23B).

As described, in the drive transmission apparatus 20, while the first stepped gear 22 rotates once, the second stepped gear 23 switches intermittently between the first driving state, the second driving state and the third driving state. Then, while the second stepped gear 23 rotates once from the home position via the first and second stop positions, the elevating plate 5 performs one reciprocating swinging movement, and the feed roller 2 rotates once.

As illustrated in the graph of FIG. 27, after the sheet feeding operation is started, the drive transmission apparatus 20 will be in a first driving state in which the small driving gear 22*c* and the large driven gear 23*a* are meshed. During a first driving state period (T1), the first stepped gear 22 rotates the second stepped gear 23 for 60 degrees and moves the second stepped gear from the home position to the first stop position, and thereafter, moves the elevating plate 5 from the standby position to the sheet feed position. Thereafter, the second stepped gear 23 will be in a drive stop state, and the first stepped gear 22 will rotate idly for a fixed period of time (T2). The rotational speed, i.e., first speed, of the second stepped gear 23 in the first driving state is determined by the transmission ratio (25/27) from the small driving gear 22*c* to the large driven gear 23*a*. That is, in a state where the first stepped gear 22 is driven to rotate at 100 [rpm], the rotational speed of the second stepped gear 23 is approximately 92.6 [rpm].

Thereafter, the drive transmission apparatus 20 will be in a second driving state in which the large driving gear 22*d* is meshed with the small driven gear 23*b*. During the period of the second driving state (T3), the first stepped gear 22 rotates the second stepped gear 23 for 198 degrees (T3) and moves the second stepped gear from the first stop position to the second step stop position, and performs sheet feed by the feed roller 2. Thereafter, the second stepped gear 23 will be in a drive stop state, and the first stepped gear 22 rotates idly for a fixed period of time (T4). The rotational speed of the second stepped gear 23 in the second driving state (i.e., second speed) is determined by the transmission ratio (32/20) from the large driving gear 22*d* to the small driven gear 23*b*. That is, if the first stepped gear 22 is driven to rotate at 100 [rpm], the rotational speed of the second stepped gear 23 will be approximately 160 [rpm].

Further, the drive transmission apparatus 20 will be in the third driving state again in which the small driving gear 22*c* is meshed with the large driven gear 23*a*. During the period of the third driving state (T5), the first stepped gear 22 rotates the second stepped gear 23 for 102 degrees and moves the second stepped gear 23 from the second stop position to the home position, and swings the elevating plate 5 from the sheet feed position to the standby position. Then, in a state where the first stepped gear 22 rotates once and stops rotating at the standby position, the second stepped gear 23 stops at the home position.

As described, the rotational speed of the output shaft 23*d* in a state where the elevating plate 5 is swung from the standby position to the sheet feed position (i.e., first driving state) is reduced in speed by approximately 42% compared to the state in which the feed roller 2 is set to feed the sheet (i.e., second driving state). Thereby, it becomes possible to reduce the impact and noise caused when the elevating plate 5 swinging from the standby position to the sheet feed position stops, while maintaining the speed in which the feed roller 2 feeds the sheet. Furthermore, the deterioration of alignment property of the sheet S supported on the elevating plate 5 can be suppressed. Further, similar to the first embodiment, the configuration enables to change the rotational speed of the output shaft 23*d* at a highly accurate timing compared to the configuration in which the rotational speed of the feeding motor is changed electrically.

Now, according to the present embodiment, even in a state where the elevating plate 5 is swung from the sheet feed position to the standby position (i.e., third driving state), the speed is reduced by approximately 42% compared to the state in which the feed roller 2 feeds sheets. Thereby, the collision noise caused when the elevating cams 2*b* and 2*c* abut against the cam contact portion 5*b* of the elevating plate 5 will be reduced. Furthermore, compared to the first embodiment, the drive torque of the elevating cams 2*b* and 2*c* for lowering the elevating plate 5 with respect to the urging force of the feed spring 6 is increased compared to the first embodiment, such that the stability of elevating and lowering operation of the elevating plate 5 can be ensured even if the motor output is small.

Moreover, since the switching of driving states is performed intermittently, it becomes possible to prevent two sets of toothed portions having different transmission ratios from being meshed at the same time, while in the drive stop state, the rotation angle of the second stepped gear 23 is retained. That is, the retention mechanism 28 retains the second stepped gear 23 at a first stop position (i.e., second rotation angle) corresponding to the sheet feed position of the elevating plate 5 and a second stop position (i.e., first rotation angle) corresponding to the standby position. Thereby, the divergence of the rotation angle of the second stepped gear 23 in the drive stop state can be reduced, and the transition of the drive transmission apparatus 20 from the drive stop state to the driving state can be performed smoothly, according to which the stability of operation of the drive transmission apparatus 20 can be improved by the operation of the retention mechanism 28.

OTHER EMBODIMENTS

According to the first and second embodiments described above, examples of a case where the drive transmission apparatuses 10 and 20 are applied to the sheet feeding apparatus have been described, but they can also be used as drive transmission apparatuses configured to drive other drive targets of the image forming apparatus. For example, in a configuration where the image forming apparatus is equipped with a flap-shape guide member capable of switching conveyance paths of the sheet by change of attitude, it may be possible that the necessary speed of change of attitude is varied between going and returning of the reciprocating movement of the guide member due to reasons such as ensuring productivity of the image forming apparatus. In this case, it may be considerable to change the speed after change of posture according to the direction of movement of the guide member using a similar drive transmission apparatus as the first and second embodiments described above.

Further, the image forming apparatus may be equipped with an auxiliary device such as a scanner unit configured to read image information from a document or a sheet processing apparatus configured to subject a sheet to binding process and other processes, in addition to the apparatus body equipped with the image forming portion. The present technique can be used as a drive transmission apparatus of such auxiliary device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-250072, filed on Dec. 22, 2016, which is hereby incorporated by reference wherein in its entirety.

What is claimed is:

1. A sheet feeding apparatus comprising:
a sheet supporting portion configured to support a sheet;
a sheet feeding member configured to contact the sheet supported on the sheet supporting portion and feed the sheet;
a switching mechanism configured to move relatively the sheet supporting portion and the sheet feeding member, so as to switch between a first state in which the sheet feeding member is able to contact the sheet on the sheet supporting portion and a second state in which the sheet feeding member is separated from the sheet on the sheet supporting portion; and
a drive transmission apparatus configured to transmit driving force from a drive source to the sheet feeding member and the switching mechanism,
wherein the drive transmission apparatus comprises:
a first rotating unit comprising a first driving gear and a second driving gear and configured to be rotated by the driving force from the drive source;
a second rotating unit configured to drive the sheet feeding member and the switching mechanism, the second rotating unit comprising:
a first driven gear configured to mesh with the first driving gear by a first transmission ratio; and
a second driven gear configured to mesh with the second driving gear by a second transmission ratio that differs from the first transmission ratio, wherein the second rotating unit is configured to switch, along with rotation of the first rotating unit, between a state in which the second rotating unit is rotated by meshing of the first driving gear and the first driven gear and a state in which the second rotating unit is rotated by meshing of the second driving gear and the second driven gear; and
a retention mechanism comprising:
a protruded portion provided on the first rotating unit and protruded radially outward with respect to a rotational axis of the first rotating unit; and
a recessed portion provided on the second rotating unit and formed into a recessed shape engageable with the protruded portion, the retention mechanism being configured to retain a rotation angle of the second rotating unit by an engagement of the protruded portion and the recessed portion while permitting rotation of the first rotating unit in a state where the first and second driving gears are unmeshed from the first and second driven gears.

2. The sheet feeding apparatus according to claim 1, wherein the protruded portion comprises a first protruded portion and a second protruded portion,
wherein the recessed portion comprises a first recessed portion engageable with the first protruded portion and a second recessed portion engageable with the second protruded portion, and
wherein the retention mechanism is configured to retain the rotation angle of the second rotating unit by an engagement of the first protruded portion and the first recessed portion during a period after the first driving gear and the first driven gear are unmeshed and before the second driving gear and the second driven gear are meshed, and is configured to retain the rotation angle of the second rotating unit by an engagement of the second protruded portion and the second recessed portion during a period after the second driving gear and the second driven gear are unmeshed and before the first driving gear and the first driven gear are meshed.

3. The sheet feeding apparatus according to claim 1, wherein at least one of the first driving gear and the second driving gear is a partially toothed gear on which a toothed portion is formed at a part in a rotation direction of the first rotating unit and on which the protruded portion is provided at another part in the rotation direction of the first rotating unit, and
wherein at least one of the first driven gear and the second driven gear is a partially toothed gear on which a toothed portion is formed at a part in a rotation direction of the second rotating unit and on which the recessed portion is provided at another part in the rotation direction of the second rotating unit.

4. The sheet feeding apparatus according to claim 1, wherein the drive transmission apparatus comprises a rotation control mechanism configured to control a rotation amount of the first rotating unit by rotating the first rotating unit one rotation at a time, and
wherein the second rotating unit is configured to be rotated once by the first rotating unit while the first rotating unit rotates once.

5. The sheet feeding apparatus according to claim 1,
wherein the first rotating unit is a first stepped gear comprising a first shaft member on which the first and second driving gears are provided, pitch radii of the first and second driving gears being different, and the second rotating unit is a second stepped gear comprising a second shaft member on which the first and second driven gears are provided, pitch radii of the first and second driven gears being different.

6. The sheet feeding apparatus according to claim 1,
wherein the protruded portion comprises a curved surface formed into a circular arc shape centering on the rotational axis of the first rotating unit, and
wherein the recessed portion comprises a curved surface formed into a concaved shape corresponding to the circular arc shape.

7. The sheet feeding apparatus according to claim 1,
wherein the second rotating unit is configured such that the second rotating unit at a first rotation angle retains the switching mechanism at the first state and that the second rotating unit at a second rotation angle retains the switching mechanism at the second state, and
wherein the retention mechanism is configured to retain the second rotating unit at least at either the first or second rotation angle.

8. The sheet feeding apparatus according to claim 1,
wherein the first transmission ratio is set smaller than the second transmission ratio, and
wherein the drive transmission apparatus is configured to drive the switching mechanism to switch the sheet supporting portion and the sheet feeding member from the second state to the first state in a state where the second rotating unit is rotated at the first transmission ratio by meshing of the first driving gear and the first driven gear, and
drive the sheet feeding member to feed the sheet on the sheet supporting portion in a state where the second rotating unit is rotated at the second transmission ratio by meshing of the second driving gear and the second driven gear.

9. The sheet feeding apparatus according to claim 8,
wherein the drive transmission apparatus is configured to drive the switching mechanism to switch the sheet supporting portion and the sheet feeding member from the first state to the second state by the second rotating unit being rotated at the first transmission ratio by meshing of the first driving gear and the first driven gear.

10. The sheet feeding apparatus according to claim 1,
wherein the sheet feeding apparatus comprises an urging member configured to urge the sheet supporting portion,
wherein the sheet supporting portion comprises a swinging member configured to be swung toward and away from the sheet feeding member with the sheet on the sheet supporting portion, the swinging member being urged by the urging member toward the sheet feeding member, and
wherein the switching mechanism comprises a cam member configured to swing the swinging member by rotating together with the second rotating unit of the drive transmission apparatus.

11. An image forming apparatus comprising:
the sheet feeding apparatus according to claim 1; and
an image forming portion configured to form an image on a sheet fed by the sheet feeding apparatus.

12. A sheet feeding apparatus comprising:
a sheet supporting portion configured to support a sheet;
a sheet feeding member configured to contact the sheet on the sheet supporting portion and feed the sheet;
a cam member configured to move the sheet supporting portion to a position where the sheet feeding member is able to contact the sheet on the sheet supporting portion and a position where the sheet feeding member is separated from the sheet on the sheet supporting portion;
an urging member configured to urge the sheet supporting portion in a direction approaching the sheet feeding member;
a drive source configured to supply driving force; and
a drive transmission apparatus comprising:
a first stepped gear comprising a first driving gear and a second driving gear, the first and second driving gears being configured to be integrally rotated by the drive source from the drive source;
a second stepped gear comprising a first driven gear configured to be meshed with the first driving gear and a second driven gear configured to be meshed with the second driving gear, the first and second driven gears being configured to be integrally rotated during the first stepped gear rotates once such that
(i) the second stepped gear is rotated at a first speed by meshing of the first driving gear and the first driven gear, and drives the cam member so that the sheet feeding member comes into contact with the sheet on the sheet supporting portion, and
(ii) the second stepped gear is rotated at a second speed that is greater than the first speed by meshing of the second driving gear and the second driven gear, and drives the sheet feeding member to feed the sheet; and
a retention mechanism comprising:
a convex portion provided on the first stepped gear and formed into a circular arc shape centering on a rotational axis of the first stepped gear; and
a concave portion provided on the second stepped gear and formed into a concaved shape engageable with the convex portion, the retention mechanism being configured to retain a rotation angle of the second stepped gear by an engagement of the convex portion and the concave portion while permitting rotation of the first stepped gear during a period after the first driving gear and the first driven gear are unmeshed and before the second driving gear and the second driven gear are meshed.

* * * * *